US006618054B2

(12) United States Patent
Deering

(10) Patent No.: US 6,618,054 B2
(45) Date of Patent: Sep. 9, 2003

(54) DYNAMIC DEPTH-OF-FIELD EMULATION BASED ON EYE-TRACKING

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/971,373

(22) Filed: Oct. 4, 2001

(65) Prior Publication Data

US 2002/0109701 A1 Aug. 15, 2002

Related U.S. Application Data

(63) Continuation-in-part of application No. 09/571,768, filed on May 16, 2000, and a continuation-in-part of application No. 09/571,988, filed on May 16, 2000.
(60) Provisional application No. 60/238,200, filed on Oct. 4, 2000.

(51) Int. Cl.⁷ ................................. G09G 5/00
(52) U.S. Cl. ................. 345/581; 345/421; 345/422; 345/589; 345/597; 345/8
(58) Field of Search ................. 345/422, 426, 345/582, 589, 594, 611, 647, 8, 32, 581, 421, 597

(56) References Cited

U.S. PATENT DOCUMENTS 5,570,433 A    10/1996   Nagamine et al.
5,995,111 A *  11/1999   Morioka et al. ............ 345/592
6,034,690 A     3/2000   Gallery et al.
6,295,070 B1 *  9/2001   Wood ......................... 345/582

FOREIGN PATENT DOCUMENTS

WO     WO 99/39307        8/1999

OTHER PUBLICATIONS

International Search Report, Application No. PCT/US01/31195, Mailed Feb. 3, 2003.
Rokita, P., "Rendering Accommodation Effects in Virtual Reality Applications", Real–Time Inaging, Academic Press Limited, GB, vol. 1, No. 5, Nov. 1, 1995, pp. 355–361.

* cited by examiner

Primary Examiner—Mark Zimmerman
Assistant Examiner—Kimbinh T. Nguyen
(74) Attorney, Agent, or Firm—Meyertons Hood Kivlin Kowert & Goetzel, P.C.; Jeffrey C. Hood

(57) ABSTRACT

A graphics system comprising a rendering engine, a sample buffer and a filtering engine. The rendering engine receives graphics primitives, generates sample positions, computes a depth value and color values for each sample position interior to each primitive. The blur value is assigned to each sample based on its depth value relative to an estimate of the concentration depth of the viewer. The per-sample data are stored in the sample buffer. The filtering engine reads samples in a neighborhood of a current filter position, and filters the samples to generate a video output pixel which is transmitted to a display device. The filtering engine applies to each sample in the neighborhood a corresponding filter function. The filter function has a spatial cutoff frequency determined by the sample's blur value.

31 Claims, 13 Drawing Sheets

DYNAMIC DEPTH-OF-FIELD EMULATION BASED ON EYE-TRACKING

CROSS-REFERENCE TO RELATED APPLICATIONS

Priority Claim

This application claims the benefit of U.S. Provisional Application No. 60/238,200 filed on Oct. 4, 2000 titled "Graphics System having a Super-Sampled Sample Buffer with Sample Filter Adjustment for Depth of Focus and Convergence Cueing".

This application is a continuation-in-part of application Ser. No. 09/571,768 filed on May 16, 2000 titled "Graphics System Using Sample Tags for Blur".

This application is a continuation-in-part of application Ser. No. 09/571,988 filed on May 16, 2000 titled "Graphics System Using Masks for Motion Blur, Depth of Field, and Transparency".

BACKGROUND OF THE INVENTION

1. Field of the Invention

This invention relates generally to the field of 3-D graphics and, more particularly, to a system and method for rendering and displaying 3-D graphical objects.

2. Description of the Related Art

The human eye is subject to many of the same optical phenomena as inanimate optical systems. In particular, for any given state of the crystalline lens, there exists a unique distance $d_f$ at which objects appear maximally sharp (i.e. minimally blurred) and an interval of distances around $d_f$ where objects have sufficient clarity. More precisely, the blurriness of objects as a function of distance from the lens varies smoothly and has a minimum at distance $d_f$. The interval of distances over which objects are sufficiently clear is commonly referred to as the depth of field. The depth of field typically increases with increasing focus distance $d_f$.

Muscles (the ciliary body) connected to the crystalline lens may exert pressure on the crystalline lens. The induced deformation of the lens changes the focus distance $d_f$. The extent of lens deformation in response to muscular pressure depends on the elasticity of the lens. The elasticity generally decreases with age. (By age 45, many people will have lost most of their elasticity: ergo bifocals). Thus, the range of focus distances $d_f$ which the human eye can achieve varies with age.

The human visual system has two directionally-controllable eyes located at the front of the head as suggested by FIG. 1. The direction of gaze of an eye may be characterized by a ray that emanates from the center of the corresponding macula (the most sensitive portion of the retina) and passes through the center of the corresponding lens. Because each eye gathers a different view on the external world, the brain is able to create a three-dimensional model of the world.

There are brain control systems which control the orientation angles and the focus distances $d_f$ of each eye. These control systems may be responsive to various sources of information including clarity and positional fusion of the images perceived by the right and left eyes. In FIG. 1A, the ocular rays intersect at point P. Thus, the image of point P will fall on the center of the perceived visual field of each eye, and the two views on the neighborhood of point P will be fused by the visual cortex into an integrated 3D entity. In contrast, because point Q lies inside the two ocular rays, the right eye perceives the point Q as being to the left of center and the left eye perceives the point Q as being to the right of center. Thus, the brain perceives two images of point Q. Similarly, because point R lies outside the two ocular rays, the right eye perceives the point R as being to the right of center and the left eye perceives the point R as being to the left of center. So the brain perceives two images of point R also.

Let $d_{r1}$ be the distance of the right eye to the intersection point P, and $d_{r2}$ be the distance of the left eye to the intersection point P as illustrated by FIG. 1B. If the brain control systems set the focus distance $d_{f1}$ of the right eye equal to distance $d_{r1}$ and the focus distance $d_{f2}$ of the left eye equal to distance $d_{r2}$, the fused image in the center of the field of view will appear maximally clear, and objects closer than and farther than the intersection point will appear increasingly blurry.

The brain control systems are programmed to strongly favor an assignment of focus distances that correspond respectively to the distances to the intersection point. For most people, it is somewhat difficult even intentionally to achieve focus distances $d_{f1}$ and $d_{f2}$ that are significantly larger than or small than the distances to the intersection point. However, this is exactly the trick that is required for proper perception of stereo video as suggested by FIG. 2A. To create the perception of a three-dimensional object at point P in front of a display screen SCR, the viewer must direct his/her eyes so that the ocular rays intersect at point P. The right ocular ray passes through P and hits the screen at position X1, and the left ocular ray passes through P and hits the screen at position X2. The screen pixels in the neighborhood of position X1 give the right eye's view on the 3D object, and the screen pixels in the neighborhood of position X2 give the left eye's view on the 3D object. The clearest perception of the 3D object is obtained if the viewer can focus her eyes beyond the intersection point P to the screen positions X1 and X2. In other words, the right eye should achieve a focus distances $d_{f1}$ equal to the distance of the right eye to screen contact position X1, and the left eye should achieve a focus distance $d_{f2}$ equal to the distance of the left eye to the screen contact position X2. Many viewers find it difficult (or impossible) to override the brain's tendency to focus at the intersection point. Focusing at the intersection point P implies that the pixilated images in the neighborhoods of X1 and X2 will appear blurry, and thus, the 3D object generated at point P will appear blurry.

FIG. 2B illustrates the complementary situation where an object is to be perceived at point P behind the screen. Again the viewer directs her gaze so the ocular rays intersect at point P. In this case, the clearest perception of the object is obtained if the viewer can achieve focus distances smaller than the distances to the intersection point P, i.e. at screen positions X1 and X2 respectively. Again, if the viewer cannot overcome the tendency to focus (i.e. optically focus) at the intersection point P, the object will appear blurred.

When the viewer looks at some object which resides at the plane of the screen, the eyes intersect at some point on the screen, and the brain can do what it is accustomed to doing: i.e. setting the optical focus distances so they correspond to the intersection point. Thus, objects at (or near) the plane of the screen should appear sharp.

In the real world, the brain's tendency to focus at the intersection point is beneficial and implies the following. As the viewer moves his/her eyes and the ocular intersection point approaches a physical object, the object becomes increasingly fused and increasingly clear at the same time.

Thus, the brain is trained to interpret increasing clarity as a clue that the eyes are moving appropriately so as to lock onto an object, and decreasing clarity as a clue that the eyes are moving away from locking onto an object.

When the viewer is observing artificially generated objects in response to stereo video, the tendency to focus at the intersection point is disadvantageous. For example, if the user attempts to lock his eyes onto a virtual object in front of screen SCR, the object may become increasingly blurry as the ocular intersection point approaches the spatial position of the virtual object (assuming the eyes are initially directed at some point on the screen). This increasing blur may actually discourage the brain control system from converging the eyes towards the virtual object to the extent where image fusion can occur. Thus, the eyes may stop short of the place where the viewer could begin to see a unified object.

Thus, there exists a need for a graphics system and method capable of generating stereo video which allows users to more easily perceive virtual objects (or portions of objects) in front of and behind the screen surface.

SUMMARY OF THE INVENTION

A graphics system may, in some embodiments, comprise a rendering engine, a sample buffer and a filtering engine. The rendering engine may receive a stream of graphics primitives, render the primitives in terms of samples, and store the samples into the sample buffer. Filtering engine may read the samples from the sample buffer, generate video output pixels from the samples, and transmit the video output pixels to a display device. The display device presents the video output to a viewer on a two-dimensional screen surface.

In one set of embodiments, the rendering engine and the filtering engine may be configured to generate a stereo video signal whose frames alternate between frames intended for the right eye and frames intended for the left eye of the viewer. The viewer may wear special glasses (e.g. shutter glasses) synchronized with the stereo video signal so the right frames are gated to the right eye and the left frames are gated to the left eye during corresponding time intervals. The graphics primitives may represent a collection of objects in a world coordinate system. Rendering engine may alternately generate frames of samples from the perspectives of a first virtual camera and a second virtual camera. In one embodiment, the position and orientation of the virtual cameras are responsive to the viewer's head and/or eye motions. In another set of embodiments, the rendering engine and filtering engine may be configured to generate a stereoscopic effect with two separate video signals targeted for two display devices respectively. Each of the display devices may be dedicated to a corresponding one of the viewer's eyes. The first video signal may be generated from the perspective of the first virtual camera and the second video signal may be generated from the perspective of the second virtual camera.

The rendering engine may send primitives through a computational pipeline (or partition the primitives among a number of parallel pipelines) to render the primitives in terms of samples. At some stage in the pipeline, a blur value may be assigned to each sample based on a function of the sample's z depth. The blur value determines how much blurring the sample is to experience in the filtration from samples to pixels applied by the filtering engine. A small blur value implies the sample gets filtered with a highly reconstructive filter, i.e. a filter whose spatial cutoff frequency is close to the anti-aliasing cutoff frequency corresponding to one cycle per two video output pixels. A large blur value implies the sample gets filtered with a filter whose spatial cutoff frequency is significantly less than the anti-aliasing cutoff frequency. In general, the spatial cutoff frequency of the filter used to operate on a sample decreases with increasing blur value.

The blur function may be configured with single valley to create a depth-of-field effect. For example, the blur function $$B(z) = \frac{(z-C)^2}{(z-C)^2 + 1}$$

has a minimum at depth C. Thus, samples in the neighborhood of depth C will translate into pixels with minimal blur (i.e. high clarity), and samples far removed from depth C will translate into pixels with a large amount of blur. More generally, the amount of applied blur a sample experiences will depend on its depth displacement (z−C). Thus, virtual objects (or portions of virtual objects) will be blurred in the displayed video output dependent on their positions with respect to the depth C. It is noted that a wide variety of functional forms are contemplated for the blur function. The example above is given for the sake of discussion and is not intended to be limiting.

The rendering engine may be configured to receive sensor measurements which indicate (a) the distance of the intersection point of the viewer's ocular rays with respect to the viewer's eyes, and (b) the distance of the viewer's eyes relative to the screen. The first distance is referred to herein as the eye-relative concentration depth. The second distance may be referred to herein as the screen-relative eye depth. The eye-relative concentration depth may be derived from measurements obtained by a pair of eye trackers fixed relative to the user's head. For example, the eye trackers may be packaged as a single unit with the shutter glasses. The screen-relative eye depth may be measured by a head tracker. The eye-relative concentration depth and the screen relative eye depth may be used to compute a screen-relative concentration depth.

The rendering engine may be configured to dynamically update the blur function in response to motion of the viewer's head and/or eyes. For example, in one embodiment, the rendering engine may track the instantaneous screen-relative concentration depth C(t) for the ocular intersection point based on the sensor measurements, and may dynamically adjust the blur function so its minimum is maintained at (or near) the instantaneous concentration depth C(t). Thus, virtual objects (or portions of virtual objects) that happen to reside in the depth neighborhood of concentration depth C(t) may appear relatively clear. More generally, virtual objects (or portions of virtual objects) may be blurred based on the extent of their depth displacement from C(t). The acquisition of sensor measurements and the computation of concentration depth C(t) may be performed at a sufficiently high rate so that the viewer does not perceive time-discontinuities in the depth-dependent blur. Furthermore, the concentration depth values $C(t_k)$ computed in response to sensor measurements at times $t_k$ may be smoothed (or interpolated) before being applied to the blur function update.

Thus, a viewer who is attempting to redirect his/her gaze at a first virtual object (say at the screen surface) to a second virtual object in front of the screen will notice the first virtual object getting more blurry and the second virtual object getting less blurry (more defined) as he/she converges the ocular rays closer to the second virtual object. This is the type of feedback that the viewer's brain is accustomed to receiving when viewing real objects in the real world. Thus, the probability of successful convergence on (and perception of) the second virtual object is increased.

In various embodiments described herein, the graphics system is said to dynamically update a blur function based on an "instantaneous" viewer concentration depth. The term "instantaneous" is used with the understanding there may be time delays between (a) the time sensor measurements are acquired, (b) the time a viewer concentration depth based on those sensor measurements is available to update the blur function, (c) the time when the blur function update has been completed, (d) the time when the updated blur function has been applied to a frame of rendered samples, (e) the time when the frame of rendered samples has been translated into output pixels by the action of the filtering engine, and (f) the time when the output pixels are presented to the viewer through one or more display devices. As used herein, the term "instantaneous" implies that these time delays are small enough so that the viewer is given the illusion of instantaneous tracking, i.e. the viewer does not perceive any significant adverse visual effects due to the time-delays.

In another set of embodiments, a graphics system may configured with a rendering engine, sample buffer and a filtering engine. The rendering engine may be configured to generate depth values and sample color vectors for a plurality of sample positions in a two-dimensional field, and assign chromatic distortion values to the sample positions based on data including the depth values and a concentration depth of a viewer. The sample color vectors may include a first color component (e.g. red) and second color component (e.g. green) for each sample position. The sample buffer may be configured to store the chromatic distortion values and the sample color vectors for the sample positions. The filtering engine may be configured to:

read the chromatic distortion values and the sample color vectors for the sample positions from the sample buffer;
  compute a first pixel color for an output pixel by filtering the first color components of the sample color vectors in a first neighborhood of a first position in the two-dimensional field; and
  compute a second pixel color for the output pixel by filtering the second color components of the sample color vectors in a second neighborhood of a second position in the two-dimensional field.

The distance of separation between the first position and the second position may be controlled by the chromatic distortion value.

BRIEF DESCRIPTION OF THE DRAWINGS

The foregoing, as well as other objects, features, and advantages of this invention may be more completely understood by reference to the following detailed description when read together with the accompanying drawings in which.

Figure 1A:
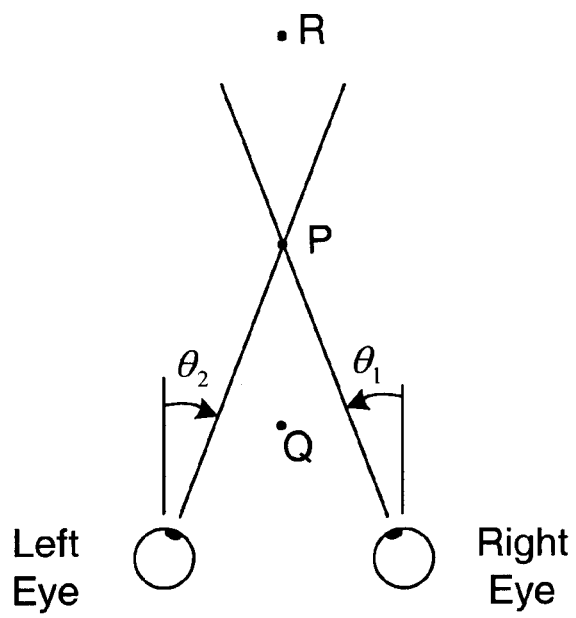
FIG. 1A illustrates the left and right eye of an observer gazing at a point P in space.
Figure 1B:
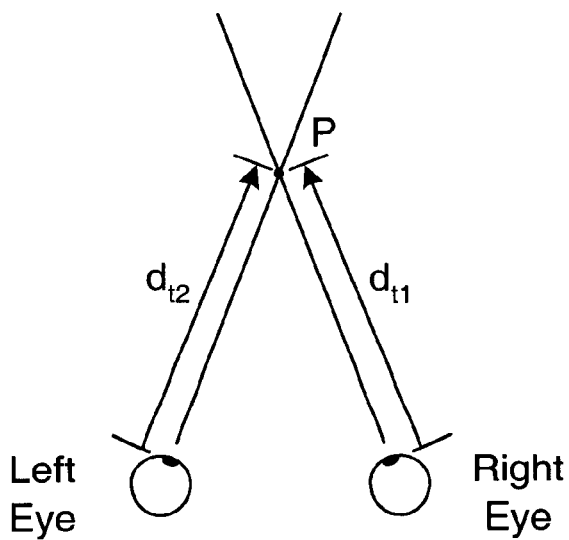
FIG. 1B highlights the distances between the observers eyes and the intersection point P.
Figure 2A:
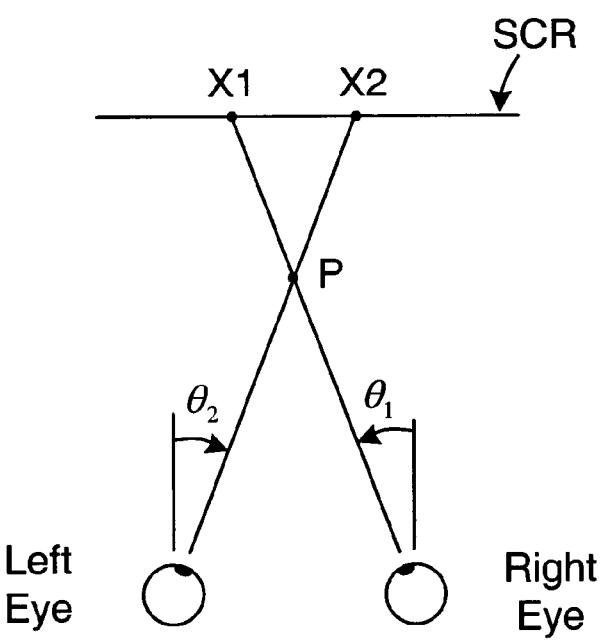
FIG. 2A illustrates a scenario where a viewer is crossing his eyes so as to intersect at a point P in front of a display screen SCR.
Figure 2B:
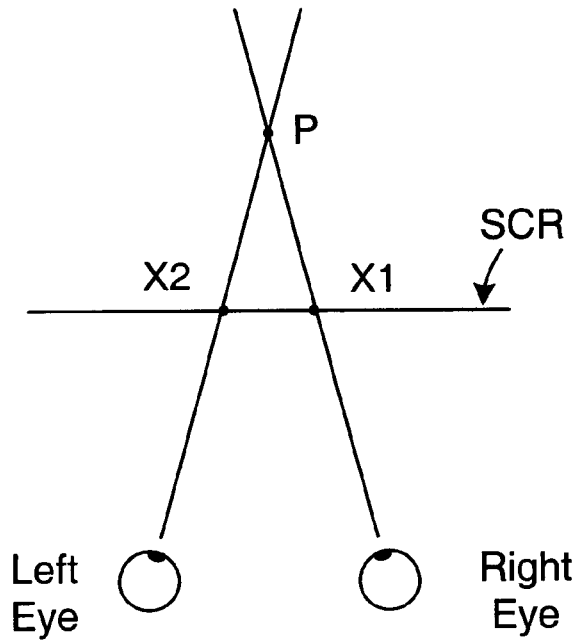
FIG. 2B illustrates a scenario where a viewer is crossing his eyes so as to intersect at a point P behind a display screen SCR.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF SEVERAL EMBODIMENTS

Figure 3:
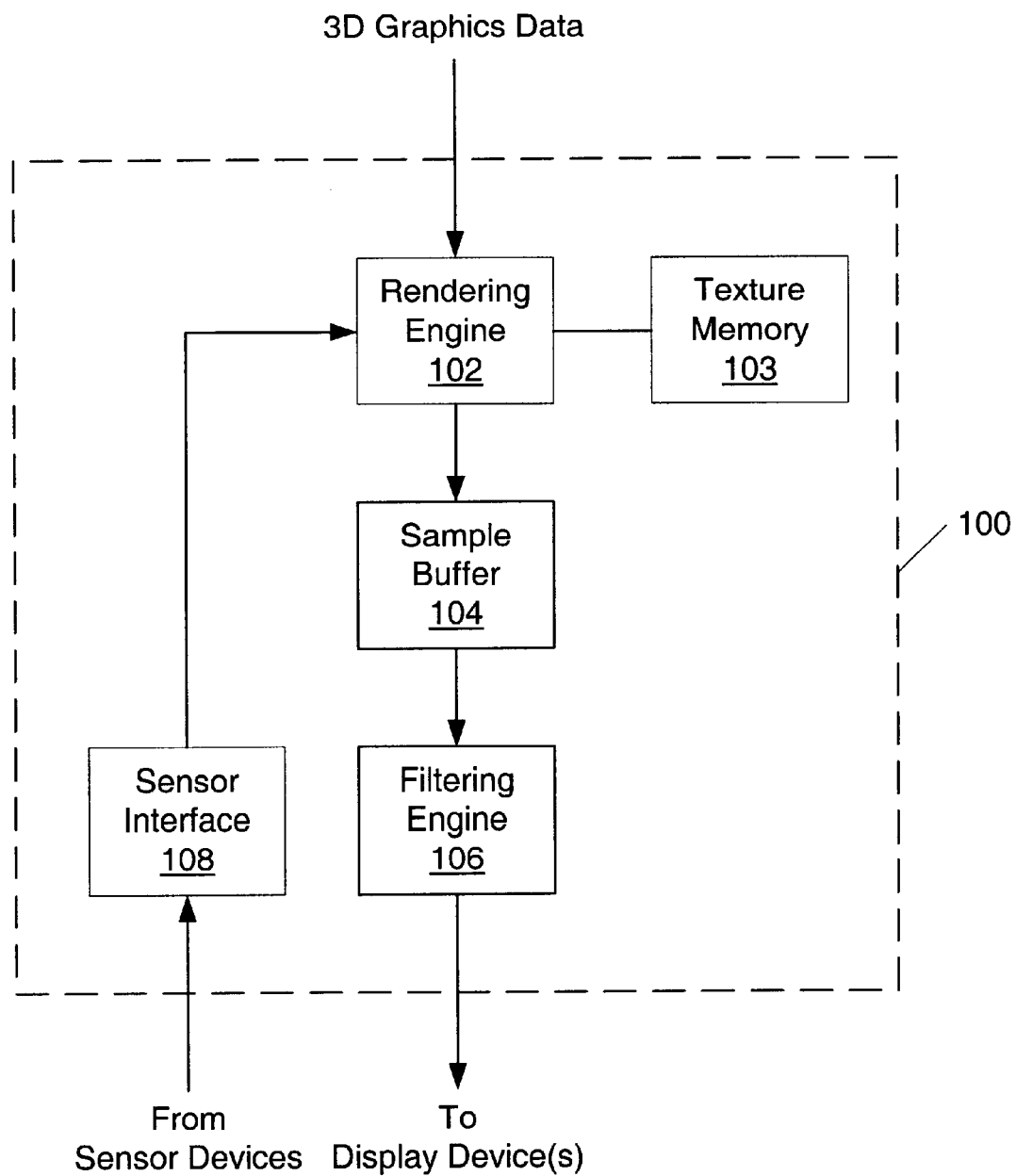
FIG. 3 illustrates one embodiment of graphics system configured to compute video output pixels by filtration of samples (e.g. supersamples)

FIG. 3—Graphics System 100

FIG. 3 illustrates one embodiment of a graphics system 100 configured to generate video signals in response to an input stream of 3D graphics data. Graphics system 100 may receive the 3D graphics data from a graphics API (i.e. an application programmer's interface such as OpenGL®, Java 3D™, PHIGS or Renderman® running on a host computer system. For example, the graphics API may store the 3D graphics data in a system memory, and graphics system 100 may read the graphics data from the system memory. The graphics API may be controlled by a graphics application (e.g. a video game, flight simulator, a CAD application or a virtual reality application) also running on the host computer system.

The 3D graphics data may comprise a stream of graphics primitives. Examples of graphics primitives include polygons, parametric surfaces, splines, non-uniform rational B-splines (NURBS), sub-division surfaces, fractals, volume primitives, and particle systems. These graphics primitives are described in detail in the textbook entitled "Computer Graphics: Principles and Practice" by James D. Foley, et al., published by Addison-Wesley Publishing Co., Inc., 1996.

Graphics system 100 comprises a rendering engine 102, texture memory 103, sample buffer 104 and filtering engine 106. Rendering engine 102 operates on the graphics primitives to generate samples, and stores the samples in sample buffer 104. Filtering engine 106 reads samples from sample buffer 104 and filters the samples to generate a stereo video signal. The stereo video signal may be transmitted to a display device such as a monitor or projector. The display device presents the frames of stereo video on a display surface. Frames intended for the right and left eyes of a viewer may be displayed alternately. The viewer may wear shutter glasses to enable perception of three-dimensional virtual objects.

Figure 4:
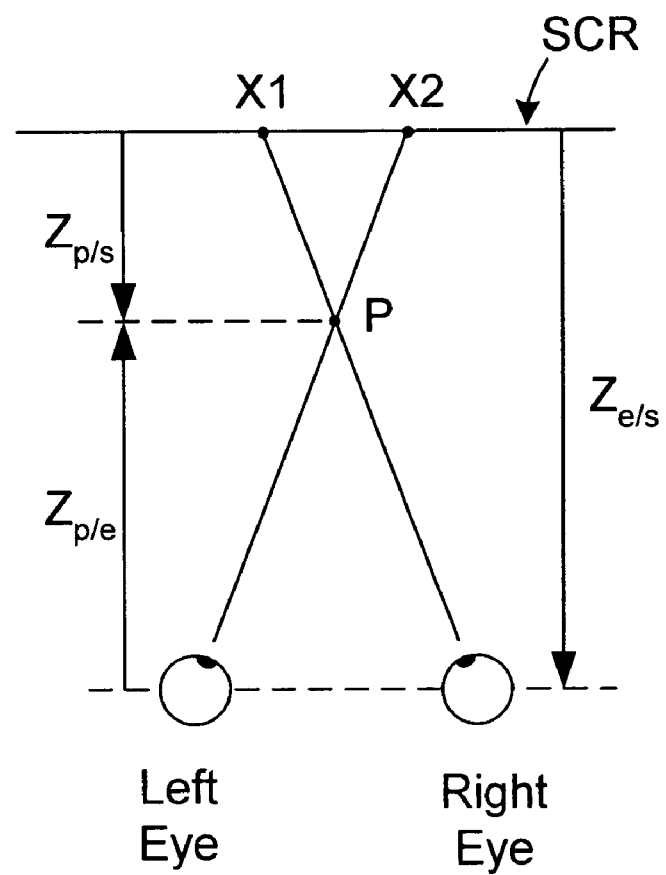
FIG. 4 defines a screen-relative concentration depth and a head-relative concentration depth which are relevant to the discussion of various embodiments disclosed herein.

The viewer may freely move his/her eyes to observe various virtual objects in the three-dimensional space. The intersection point P of the viewer's ocular rays has a depth $Z_{p/s}$ with respect to the screen SCR as suggested by FIG. 4. This screen-relative concentration depth $Z_{p/s}$ may be determined based on (1) the depth $Z_{p/e}$ of the intersection point P with respect to the viewer's eyes and (2) the depth $Z_{e/s}$ of the viewer's eyes with respect to the screen.

The eye-relative concentration depth $Z_{p/e}$ may be determined by measurements obtained by a pair of eye trackers attached to the viewer's head (e.g. embedded in the shutter glasses). For example, an eye tracker may be configured to measure the horizontal displacement of a single eye by illuminating the eye with an infrared beam, and measuring the amount of light reflected from the eye's surface in one or more directions. Because the white of the eye reflects more than the pupil or iris, the reflected infrared (IR) energy provides a measure of the horizontal displacement of the pupil with respect to a center position. Two such eye trackers, one for each eye, may be used to measure the horizontal displacements of the right and left eyes, and these horizontal displacements may be used to compute (or lookup) the eye-relative concentration depth $Z_{p/e}$. The screen-relative depth $Z_{e/s}$ of the viewer's eyes may be determined from measurements obtained by a head tracking device.

Graphics system 100 may include a sensor interface 108 for coupling to sensor devices, e.g. the eye trackers and/or the head tracker. Sensor interface 108 may receive sensor measurements from the sensor devices, and may provide the sensor measurements to rendering engine 102. Rendering engine 102 may estimate the screen-relative concentration depth $Z_{p/s}$ in response to the sensor measurements. Alternatively, sensor interface 108 may estimate the screen-relative concentration depth $Z_{p/s}$ in response to the measurements, and pass this concentration depth to rendering engine 102. Note, in other embodiments, the sensors may be coupled to the host computer system through an interface (e.g. a data acquisition board) separate from graphics system 100. Thus, the graphics system may receive the sensor data from the system memory of the host computer system.

Rendering engine 102 may organize its generation of samples based on an array of render pixels. The render pixel array may have dimension $M_r \times N_r$, i.e. may comprise $M_r$ render pixels horizontally and $N_r$ render pixels vertically. Rendering engine 102 may be configured to generate a programmable number $N_{s/rp}$ of sample positions per render pixel. If a render pixel is found to intersect with a given primitive (e.g. polygon), rendering engine 102 may (a) generate $N_{s/rp}$ sample positions in the render pixel, (b) determine which of the sample positions fall inside the primitive, and (c) compute color information for the interior sample positions based on a spatial interpolation of the color values at the vertices of the primitive. In addition, if the primitive is to be textured, one or more texture values may be determined for the intersecting render pixel, and the one or more texture values may be used in step (c) to determine the interior sample colors. In some embodiments, render array size parameters $M_r$ and $N_r$ and sample density parameter $N_{s/rp}$ may be changed on a per-frame basis. Furthermore, the size parameters $M_r$ and $N_r$ and the sample density parameter $N_{s/rp}$ may be varied independently. Step (c) is referred to herein as the "sample fill" process. Rendering engine 102 may perform some or all of the sample-fill processing using dedicated circuitry.

Sample buffer 104 may be double-buffered, i.e. may include two buffer segments. Thus, rendering engine 102 may write into one buffer segment, while filtering engine 106 reads from the other buffer segment.

In some embodiments, after clipping and perspective divide, what remains is a viewport with finite extent in the horizontal and vertical directions, e.g., with an extent which ranges from −1 to 1 in the horizontal coordinate x and from −1 to 1 in the vertical coordinate y. Rendering engine 102 may perform a transformation on primitives which maps the viewport onto the render pixel array (i.e. so as to exactly cover the render pixel array) as suggested in FIG. 5. For example, the viewport to render array mapping may be described by the following expression.

$$(x, y) \to \left(\frac{M_r}{2}x + \frac{M_r}{2}, \frac{N_r}{2}y + \frac{N_r}{2}\right).$$

Because the viewport maps onto the render pixel array, smaller values for the render array sizes $M_r$ and $N_r$ imply that each primitive (e.g. triangle) intersects fewer render pixels. Fewer intersecting render pixels implies fewer texture memory accesses, and also less computational burden on the sample-fill process if the sample density $N_{s/rp}$ remains constant. Thus, rendering engine 102 may more quickly complete rendering of the primitives for the current frame using the smaller render pixel array.

Figure 6:
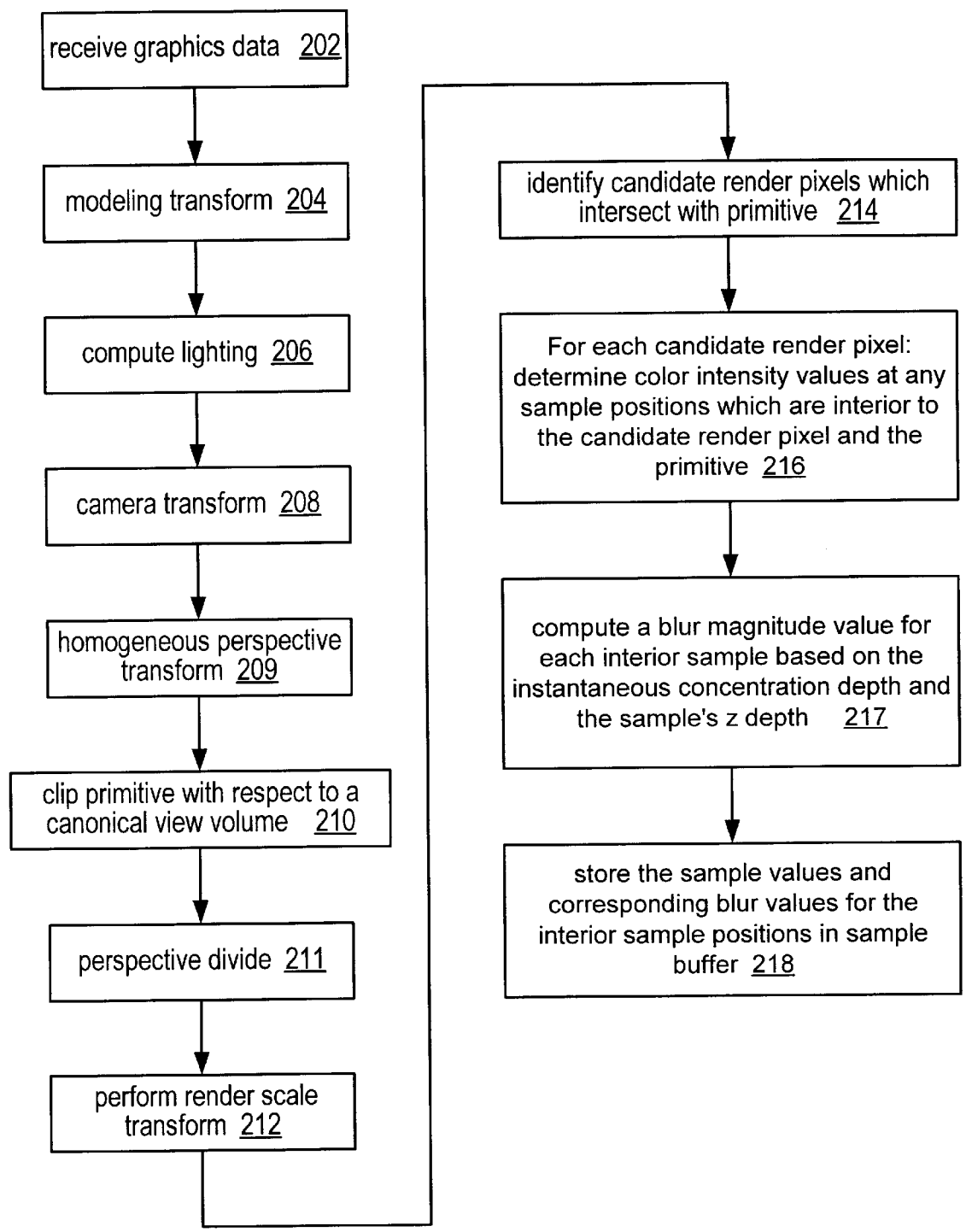
FIG. 6 illustrates one embodiment of a graphics pipeline for rendering samples in response to received graphics primitives.

FIG. 6 illustrates one embodiment of a computational pipeline implemented by rendering engine 102. In step 202, rendering engine 202 receives a stream of graphics data from an input port, and stores the graphics data in an input buffer. The graphics data includes a stream of graphics primitives.

In step 204, rendering engine 102 may access a primitive (e.g. a polygon) from the input buffer, and perform a modeling transformation on the primitive. The modeling transformation injects the primitive into a world coordinate system, and may be the composition of a series of transformations. For example, a primitive on the hand of a virtual human may be operated on by a modeling transformation which is the composite of (a) a first transformation designating the orientation of hand with respect to a forearm, (b) a second transformation designating the orientation of forearm with respect to upper arm, (c) a third transformation designating the orientation of upper arm with respect to torso, a fourth transformation designating the position and orientation of the torso with respect to the world coordinate system. Thus, the modeling transformation may require updating whenever any component in its composition chain changes. The modeling transformation may also include the transformation of any normal vectors associated with the primitive.

In step 206, rendering engine 102 may subject the primitive to a lighting computation. Lighting intensity values (e.g. color intensity values) may be computed for the vertices of polygonal primitives based on:

(1) the vertex normals;

(2) the position and orientation of a virtual camera in the world coordinate system;

(3) the intensity, position, orientation and type-classification of light sources; and (4) the material properties of the primitives such as their intrinsic color values, ambient, diffuse and/or specular reflection coefficients.

The vertex normals (or change in normal from one vertex to the next) may be provided as part of the graphics data stream, or may be computed from polygon normals. Polygon normals in turn may be computed from the vertices (e.g. based on a cross product). Rendering engine 102 may implement any of a wide variety of lighting models. It is noted that separate virtual camera positions may be maintained for the viewer's left and right eyes. Rendering engine 102 may alternate between the left camera position and the right camera position from frame to frame.

In step 208, rendering engine 102 may perform a camera transformation on the vertices of the primitive. The camera transformation may be interpreted as giving the coordinates of the primitive vertices with respect to a camera coordinate system which is rigidly bound to a virtual camera in the virtual world space. Thus, the camera transformation may require updating whenever the camera position and/or orientation changes. The virtual camera position and/or orientation may be controlled by user actions such as manipulations of a joystick. In some embodiments, the virtual camera orientation may be controlled by measurements of a user's head position and/or eye orientation(s).

In step 209, rendering engine 102 may perform a homogenous perspective transformation to map primitives from the camera coordinate system into a clipping space. The homogeneous perspective transformation may map a 3D view volume (defined by the virtual camera position and view window in virtual world space) to a canonical view volume which is more convenient for the clipping computation.

In step 210, rendering engine 102 may perform a clipping computation on the primitive. In clipping space, the vertices of primitives may be represented as 4-tuples (X,Y,Z,W), and the clipping may be implemented by performing a series of inequality tests as follows:

$T1=(-W \leq X)$ $T2=(X \leq W)$ $T3=(-W \leq Y)$ $T4=(Y \leq W)$ $T5=(-W \leq Z)$ $T6=(Z \leq 0)$ If all the test flags are all true, a vertex resides inside the canonical view volume. If any of the test flags are false, the vertex is outside the canonical view volume. An edge between vertices A and B is inside the canonical view volume if both vertices are. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with clipping planes. A primitive may thus be cut down to one or more interior sub-primitives. Thus, rendering engine 102 may compute color intensity values for the new vertices generated by clipping.

In step 211, rendering engine 102 may perform a perspective divide on the homogenous post-clipping vertices (X,Y,Z,W) according to the relations $x=X/W$ $y=Y/W$ $z=Z/W$.

After the perspective divide, the primitives reside in a viewport square defined by the inequalities $-1 \leq x \leq 1$ and $-1 \leq y \leq 1$.

Figure 5:
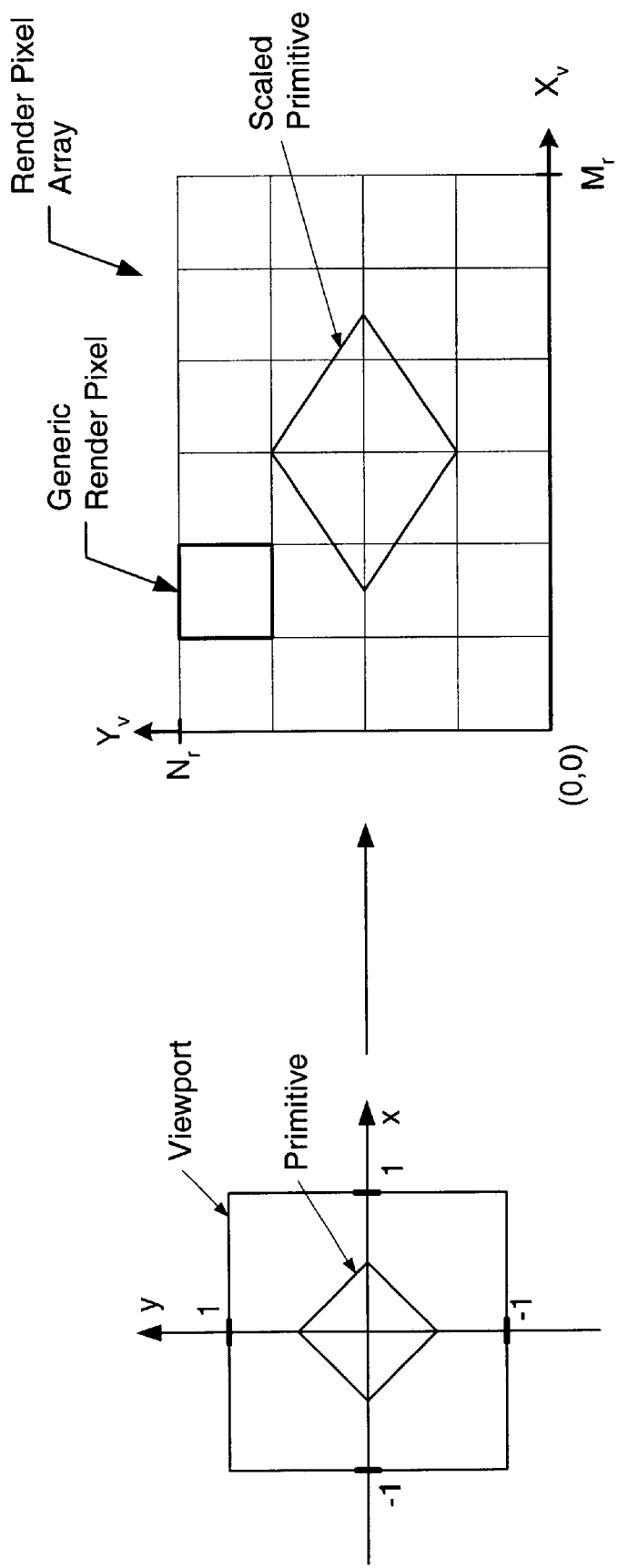
FIG. 5 illustrates a render scale transformation which transforms a post-clipping viewport onto a render pixel array in a virtual screen space according to one embodiment.

In step 212, rendering engine 102 may perform the render scale transformation on the post-clipping primitives as suggested by FIG. 5. The render scale transformation may map the viewport square in perspective-divided space onto the render pixel array in virtual screen space, i.e. onto a rectangle whose width equals the array horizontal resolution $M_r$ and whose height equals the array vertical resolution $N_r$. Let $X_v$ and $Y_v$ denote respectively the horizontal and vertical coordinate in the virtual screen space. It is noted that rendering engine 102 may be configured to map the viewport square onto a rectangular region which does not completely cover the render pixel array. The position and dimensions of the rectangular window may be defined by user input.

Figure 7:
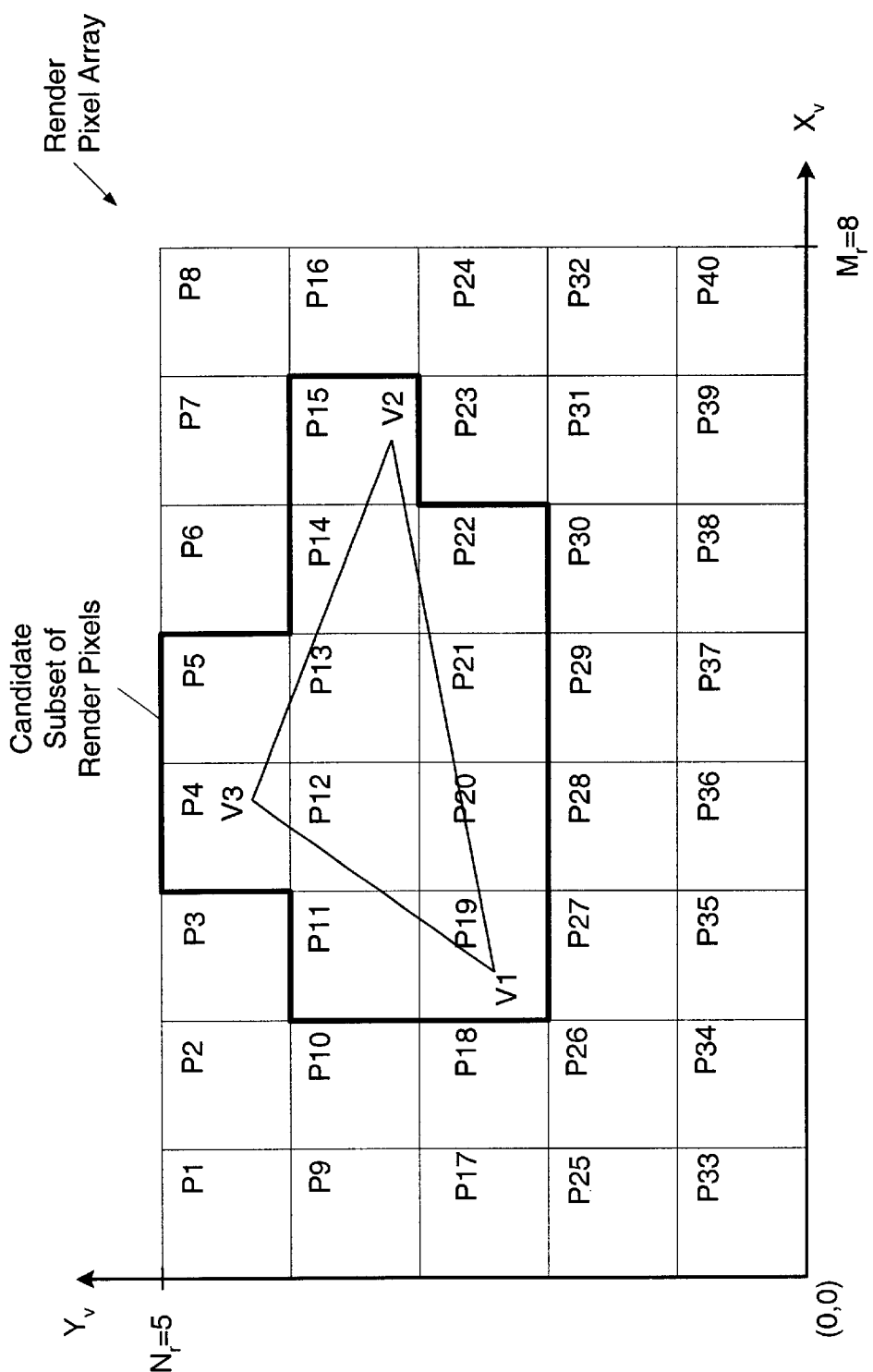
FIG. 7 illustrates an array of render pixels and a candidate subset of render pixels which geometrically intersect with a given primitive.

In step 214, rendering engine 102 may identify a subset of render pixels which geometrically intersect with the post-scaling primitive as suggested by FIG. 7. Render pixels in this subset are referred to as "candidate" render pixels or "intersecting" render pixels. It is noted that values $M_r=8$ and $N_r=5$ for the dimensions of the render pixel array have been chosen for sake of illustration, and are much smaller than would typically be used in most embodiments of graphics system 100.

Figure 8:
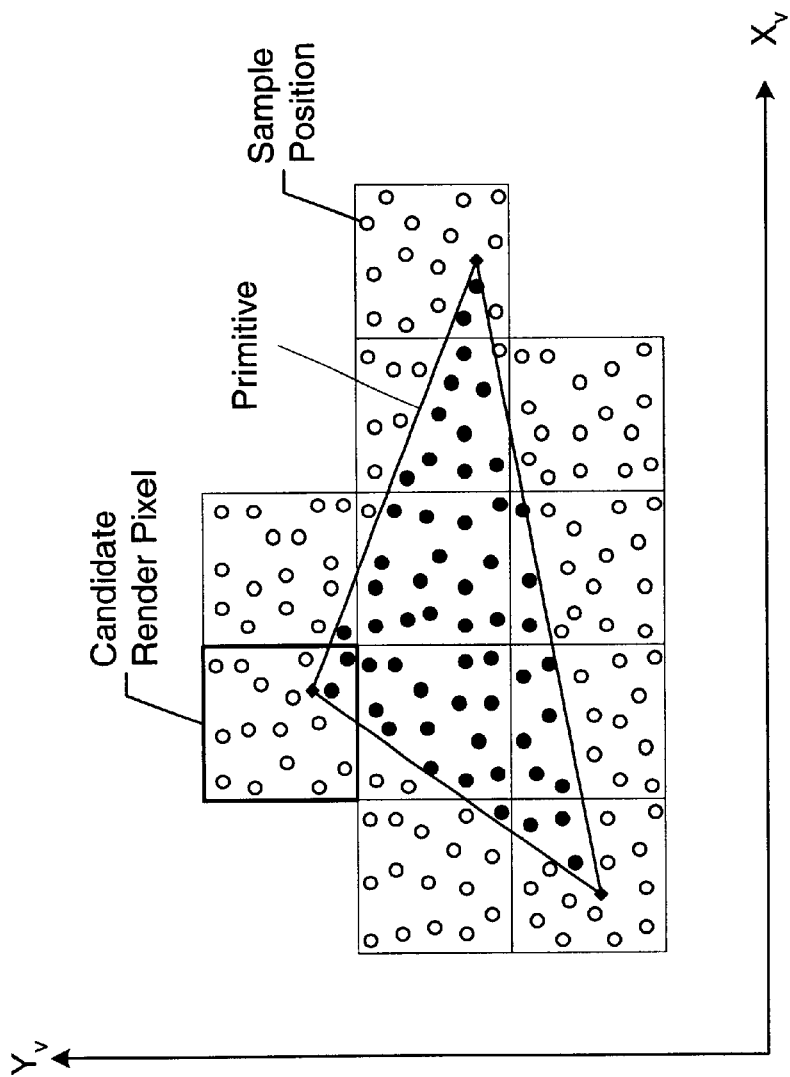
FIG. 8 illustrates the candidate render pixels populated with sample positions (e.g. stochastically distributed sample positions) and sample positions interior to the primitive denoted as black dots.

In step 216, rendering engine 102 may operate on each candidate render pixel by computing color intensity values at any sample positions which reside interior to the primitive and the candidate render pixel as suggested by FIG. 8. In FIG. 8, interior sample positions are denoted as small black dots, and exterior sample positions are denoted as small circles. Step 216 is described more elaborately below.

In step 217, rendering engine 102 may compute a blur magnitude for each interior sample of the candidate render pixel based on the z coordinate of the interior sample and the z coordinate of the current intersection point P of the viewer's ocular rays.

For convenience of discussion, assume the z coordinate is defined so that the z=0 plane corresponds to the screen and the positive direction of the z axis is defined so that the viewer resides in the z>0 half space. Rendering engine 102 may compute the blur magnitude for each interior sample S based on an estimate of the current value $Z_{p/s}(t)$ of the screen-relative concentration depth $Z_{p/s}$ (see FIG. 4) and the z coordinate $z_S$ of the interior sample. In particular, rendering engine 102 may assign the blur magnitude of each interior sample based on a blur function as suggested by FIG. 9A. The blur function attains a minimum value of zero at the current concentration depth $Z_{p/s}(t)$. Thus, the blur magnitude may vary continuously as a function of sample depth $z_S$. For example, samples having depths $z_S$ in the neighborhood of the current concentration depth may be assigned small blur magnitude values, and samples having depths $z_S$ far removed from the current concentration depth may be assigned large blur magnitudes. The blur magnitude of each sample controls how much "blurring" the sample is to experience in the filtration from samples to pixels applied by filtering engine 106.

Filtering engine 106 generates each video output pixel by filtering a neighborhood of samples. In one set of embodiments, each sample in the neighborhood is assigned a filter coefficient based on a filter which induces blurring to an extent determined by the sample's blur magnitude value. A blur magnitude value of zero corresponds to a highly reconstructive filter which retains spatial frequencies up to the anti-aliasing cutoff frequency $f_r$ corresponding to one cycle per two pixels. A maximal blur magnitude value corresponds to a highly blurring filter which retains spatial frequencies up to a cutoff frequency which is significantly smaller than the anti-aliasing cutoff frequency $f_r$. Filtering engine 106 computes a weighted average of sample color values using the filter coefficients to determine the corresponding pixel color values. Thus, a neighborhood of screen pixels generated from samples having large blur magnitudes will present the image information implicit in the samples with a significant amount of blur. Conversely, a neighborhood of pixels generated from samples having small blur magnitudes will present the image information implicit in the sample relatively clearly.

The blur function may be dynamically updated so that as the viewer moves his/her eyes the absolute minimum of the blur function is maintained at (or near) the instantaneous screen-relative concentration depth $Z_{p/s}(t)$. Thus, virtual objects (or portions of virtual objects) in the depth neighborhood of the instantaneous concentration depth $Z_{p/s}(t)$ may be rendered more clearly on screen SCR than virtual objects (or portions of virtual objects) closer or farther than this depth neighborhood. In one set of embodiments, the blur function may be updated on a frame by frame basis, or once every N frames where N is an integer greater than one. In another set of embodiments, the rate of blur function update may be non-uniform and may depend on the rate of change of the concentration depth, i.e. higher rates of depth change being connected with higher rates of blur function updating.

The rate at which sensor measurements (e.g. eye tracker and head tracker measurements) are acquired at least partially determines the quality of tracking of the screen-relative concentration depth $Z_{p/s}(t)$. It is typically desirable to have a sensor measurement rate which is high enough so the viewer does not perceive time-discontinuities in the depth-dependent blurring generated by graphics system 100. In some embodiments, sensor measurements may be obtained at a first rate, while graphics system 100 estimates values for the screen-relative concentration depth at another higher rate by interpolation.

Figure 9A:
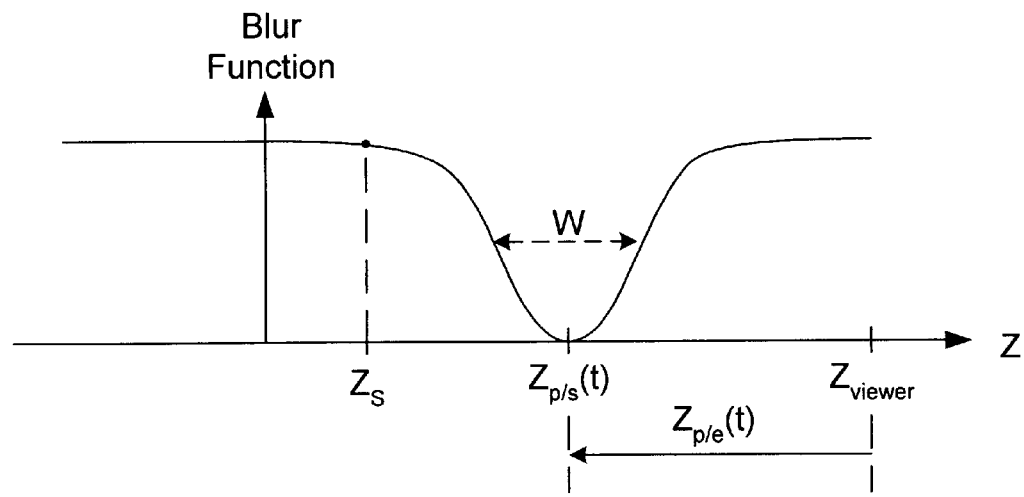
FIG. 9A illustrates a blur function which attains a minimum at the screen-relative concentration depth of the viewer.

As suggested by FIG. 9A, the blur function may have a valley centered at (or near) the instantaneous screen-relative concentration depth $Z_{p/s}(t)$. Let W denote the width of the valley. In one set of embodiments, the width W may vary as a function of the instantaneous eye-relative concentration depth $Z_{p/e}(t)$. For example, the width W may be an increasing function of the eye-relative concentration depth. Thus, W may attain small values when the viewer is concentrating on objects close to his/her head, and may attain larger values when the viewer is concentrating on objects farther from his/her head.

Figure 9B:
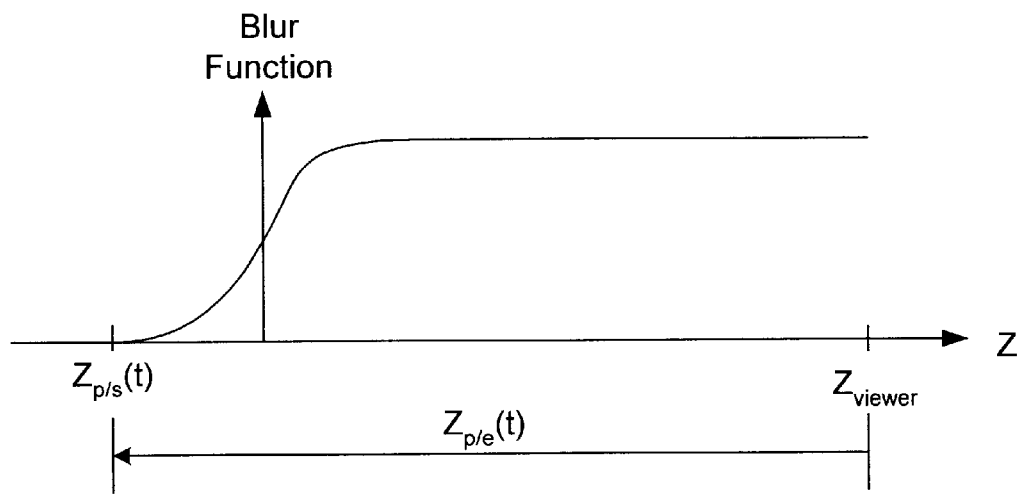
FIG. 9B illustrates a second blur function which attains zero blur beyond a certain distance from the viewer.

In another set of embodiments, the valley may be asymmetric, i.e. may rise more rapidly on one side than the other. In these embodiments, the valley may be characterized by two widths, one for each side of the valley. In yet another set of embodiments, the family of blur functions may include blur functions as suggested by FIG. 9B, where the negative infinity side of the valley is flattened to zero. Thus, virtual objects (or portions of virtual objects) farther from the viewer than the eye-relative concentration depth $Z_{p/e}(t)$ may be rendered more clearly on screen SCR than virtual objects (or portions of virtual objects) closer than this depth.

In some embodiments, the blur function evaluation may be performed by table lookup and interpolation. The blur table may store values of the blur function indexed by the difference value $z_S - Z_{p/s}(t)$, where $z_S$ is the sample's depth coordinate and $Z_{p/s}(t)$ is an estimate of the instantaneous screen-relative concentration depth of the viewer. In one embodiment, the blur function may be effectively stretched or contracted by multiplying the difference value $z_S - Z_{p/s}(t)$ by a width correction factor k before accessing the blur table. Width correction factors k smaller than one (and positive) correspond to stretching. The width correction factor k may itself be determined by table lookup in a width correction table. The width correction table may be accessed based on the instantaneous eye-relative concentration depth $Z_{p/e}(t)$.

In step 218, rendering engine 102 may store the computed color intensity values and blur magnitude values for the interior sample positions in sample buffer 104. In some embodiments, rendering engine 102 may store an encoded version of the blur magnitude instead of the blur magnitude.

Figure 10:
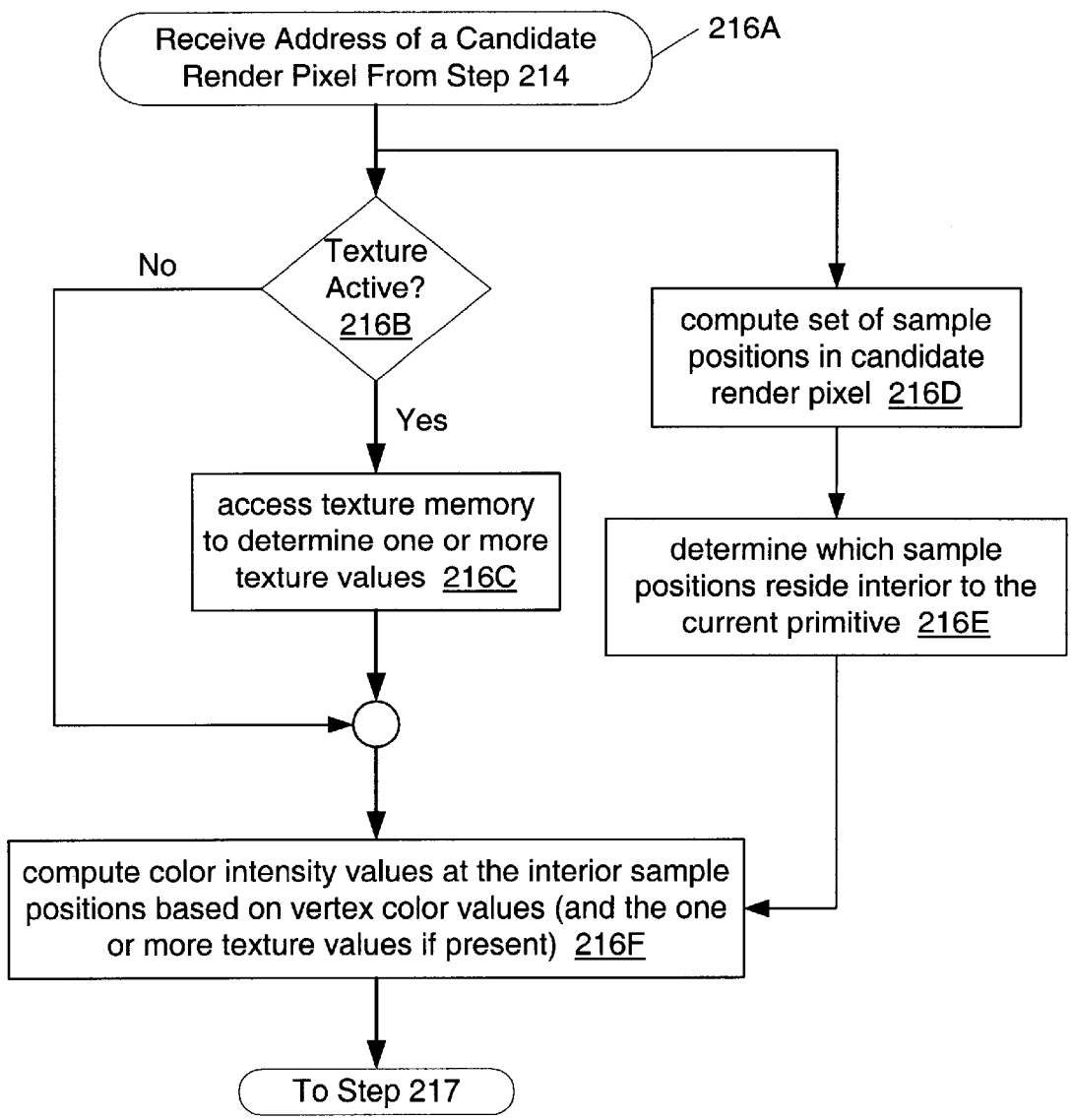
FIG. 10 is a flow diagram describing one embodiment of step 216 of FIG. 6, i.e. one embodiment of a method by which sample values may be assigned to interior sample positions of candidate render pixels.

FIG. 10 illustrates step 216 in more detail. In step 216A, rendering engine 102 may access an address of a candidate render pixel determined in step 214. In step 216B, rendering engine 102 may determine if a texture state indicator is true. If the texture state indicator is true, rendering engine 102 may perform step 216C. Otherwise, rendering engine 102 may skip step 216C and jump to step 216F.

In step 216C, rendering engine may access texture memory 103 to determine one or more texture values for the candidate render pixel. Texture memory 103 contains textures which are to be mapped onto objects (or portions of objects). Each texture may comprise an array of texels (i.e. texture elements). A texture may be organized as a MIP (multum in parvo—i.e. many things in a small place) map, where a fundamental texture image is represented at multiple different scales. Because textures are often applied to curved surfaces, the mapping from render pixel coordinates to texture coordinates is generally non-linear, and the centers of candidate render pixels typically do not map onto texel centers.

In step 216D, rendering engine 102 may compute a set of sample positions in the candidate render pixel. The sample positions may be generated according to a regular or pseudo-random pattern. In one embodiment, graphics system 100 includes a sample position memory which stores a list of horizontal and vertical sample positions offsets. The horizontal and vertical sample position offsets may be added to the origin of the candidate render pixel to generate the sample positions. The sample density parameter $N_{s/rp}$ determines the number of sample positions to be generated per candidate render pixel. The sample density parameter $N_{s/rp}$ may vary from one up to maximum value. In one embodiment the maximum value is sixteen. However, the maximum sample density may attain larger values at the expense of more sample processing hardware and/or more sample buffer memory.

In step 216E, rendering engine 102 may determine which of the sample positions in the candidate render pixel fall inside the current primitive. These sample positions falling inside the primitive will be referred to herein as "interior" sample positions.

It is noted that steps 216B and 216C may be performed in parallel with steps 216D and 216E.

In step 216F, rendering engine 102 may compute color intensity values for the interior sample positions of the candidate render pixel based on the vertex color values and also on the one or more texture values if texture processing step 216C was performed. Step 216F is referred to herein as the "sample-fill" computation. The present invention contemplates a wide variety of ways for performing the "sample-fill" computation. In one embodiment, the sample-fill computation may be programmable. Thus, a system designer/programmer may specify any desired functional combination of the vertex coordinates, vertex color intensity values, and one or more texture values to determine the sample color intensity values.

Figure 11:
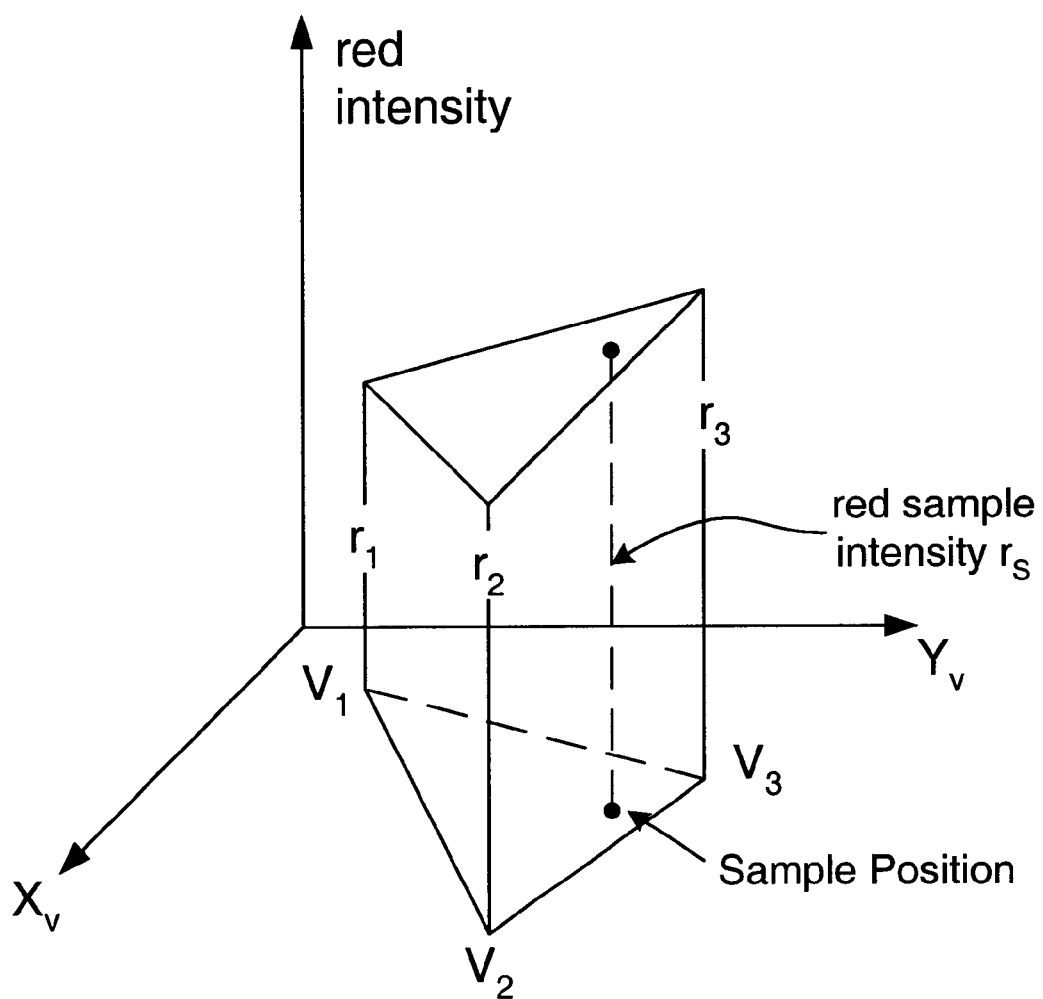
FIG. 11 suggests a linear spatial interpolation of a red intensity value for sample position interior to a triangle in the virtual screen space based on the red sample intensities at the vertices of a triangle.

In a second embodiment, rendering engine 102 may compute initial color values for the interior sample positions of the candidate render pixel based on a spatial interpolation of vertex color values as suggested by FIG. 11. FIG. 11 illustrates a linear interpolation of a red intensity value $r_s$ for a sample position inside the triangle defined by the vertices V1, V2 and V3 in virtual screen space (i.e. the horizontal plane of the figure). The red color intensity is shown as the up-down coordinate. Each vertex Vk has a corresponding red intensity value $r_k$. (The vertex color values are computed in the lighting computation 206). In this embodiment, three texture values may be determined (in step 216C) for the candidate render pixel, i.e. one for each color component. These texture colors may multiply the corresponding sample initial color values. In other words, textured color values for each interior sample of the candidate render pixel may be computed according to the relations $Tred_S$=(red texture value)($r_S$), $Tgreen_S$=(green texture value)($g_S$), $Tblue_S$=(blue texture value)($b_S$), where ($r_S,b_S,g_S$) is the initial color intensity vector computed by spatial interpolation for the sample S. The textured sample color values may be further subjected to depth-cueing, fogging and/or the addition of a separately interpolated specular color.

For specificity in the discussion of step 217 above, the z coordinate was assumed to have its origin at the screen SCR. More generally, the z coordinate may be defined in various ways depending on the dictates of the user, the structure of the rendering pipeline implemented in rendering engine 102, the type of graphics data to be handled by the graphics system, the type of software application to be run on the host computer, etc. The magnitudes of the blur values assigned to samples depends on their z distances from the current intersection point P of the viewer's ocular rays.

In some applications, e.g. in 3D virtual reality applications, the z coordinate may have its origin at the eye of the user. Thus, in these applications, the eye-relative concentration depth $Z_{p/e}$ may the significant parameter to compute and track rather than the screen-relative concentration depth $Z_{p/s}$. The blur function may be updated so that its minimum occurs at the instantaneous eye-relative concentration depth $Z_{p/e}(t)$. The rendering engine 102 may compute differences between the z coordinates of samples and the instantaneous eye-relative concentration depth $Z_{p/e}(t)$, and use the differences to access a blur function table for the blur values.

For information on generating complex 3D stereo images in response to real time viewer head movements, please refer to U.S. Pat. No. 5,287,437, issued on Feb. 15, 1994, entitled "Method and apparatus for head tracked display of precomputed stereo images" which is hereby incorporated by reference it is entirety.

For information on a head tracked stereo display system for generating virtual images over a wide range of viewer head movement, and for intermixing light from virtual objects and real objects in a natural arrangement, please refer to U.S. Pat. No. 5,394,202 issued on Feb. 28, 1995, entitled "Method and apparatus for generating high resolution 3D images in a head tracked stereo display system" which is hereby incorporated by reference in it entirety.

Filtration of Samples to Determine Pixels

Figure 12A:
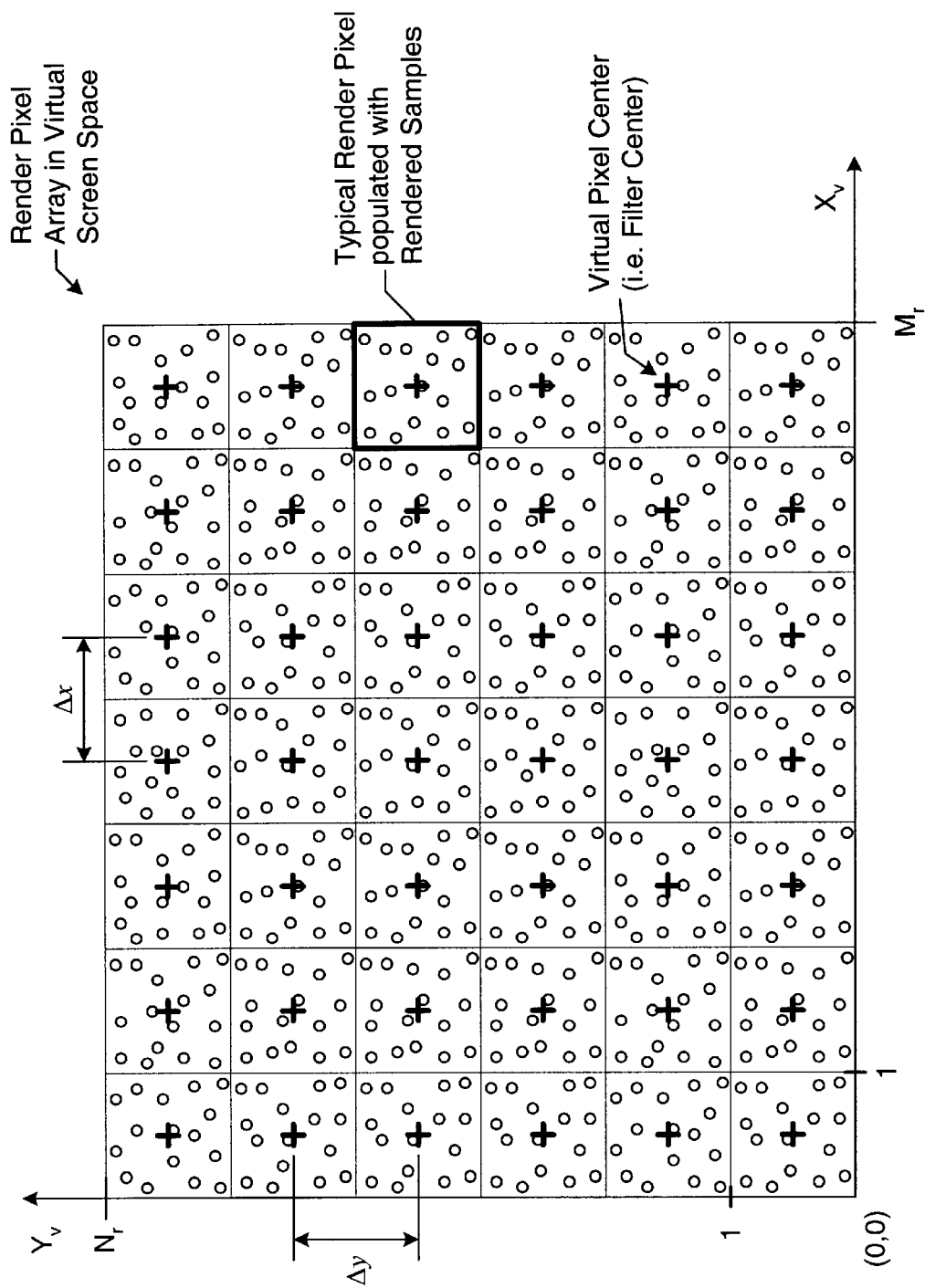
FIG. 12A illustrates the virtual screen space populated with samples organized as an array of render pixels, and an array of virtual pixel centers (i.e. loci for computation of video output pixels) superimposed on the render pixel array according to one set of embodiments.

When rendering engine 102 has completed the rendering of a frame into one of the buffer segments of sample buffer 104, filtering engine 106 may access the samples contained in the buffer segment and generate video output pixels from these samples. Each buffer segment of sample buffer 104 stores an $M_r \times N_r$ array of render pixels. Each render pixel stores $N_{s/rp}$ samples. Recall that $M_r$, $N_r$ and $N_{s/rp}$ are programmable parameters. Thus, the set of addresses represented by the render pixel array in the buffer segments may change from frame to frame. As suggested by FIG. 12A, filtering engine 106 may scan through virtual screen space in raster fashion (or a distorted raster fashion in order to compensate for display/projector distortions) generating virtual pixel positions denoted by the small cross markers, and generating a video output pixel at each of the virtual pixel positions based on the samples (small circles) in the neighborhood of the virtual pixel position. The virtual pixel positions are also referred to herein as filter centers since the video output pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position ($X_{start}, Y_{start}$). The horizontal displacement $\Delta X$ and vertical displacement $\Delta Y$ and the start coordinates $X_{start}$ and $Y_{start}$ are programmable parameters. FIG. 12A illustrates a virtual pixel position at the center of each render pixel. This implies that the horizontal and vertical displacements of the virtual pixel array equal one, and the start position equals (½,½). However, this arrangement of the virtual pixel positions (at the centers of render pixels) is a special case. More generally, the horizontal displacement $\Delta x$ and vertical displacement $\Delta y$ may be assigned values greater than or less than one.

Figure 12B:
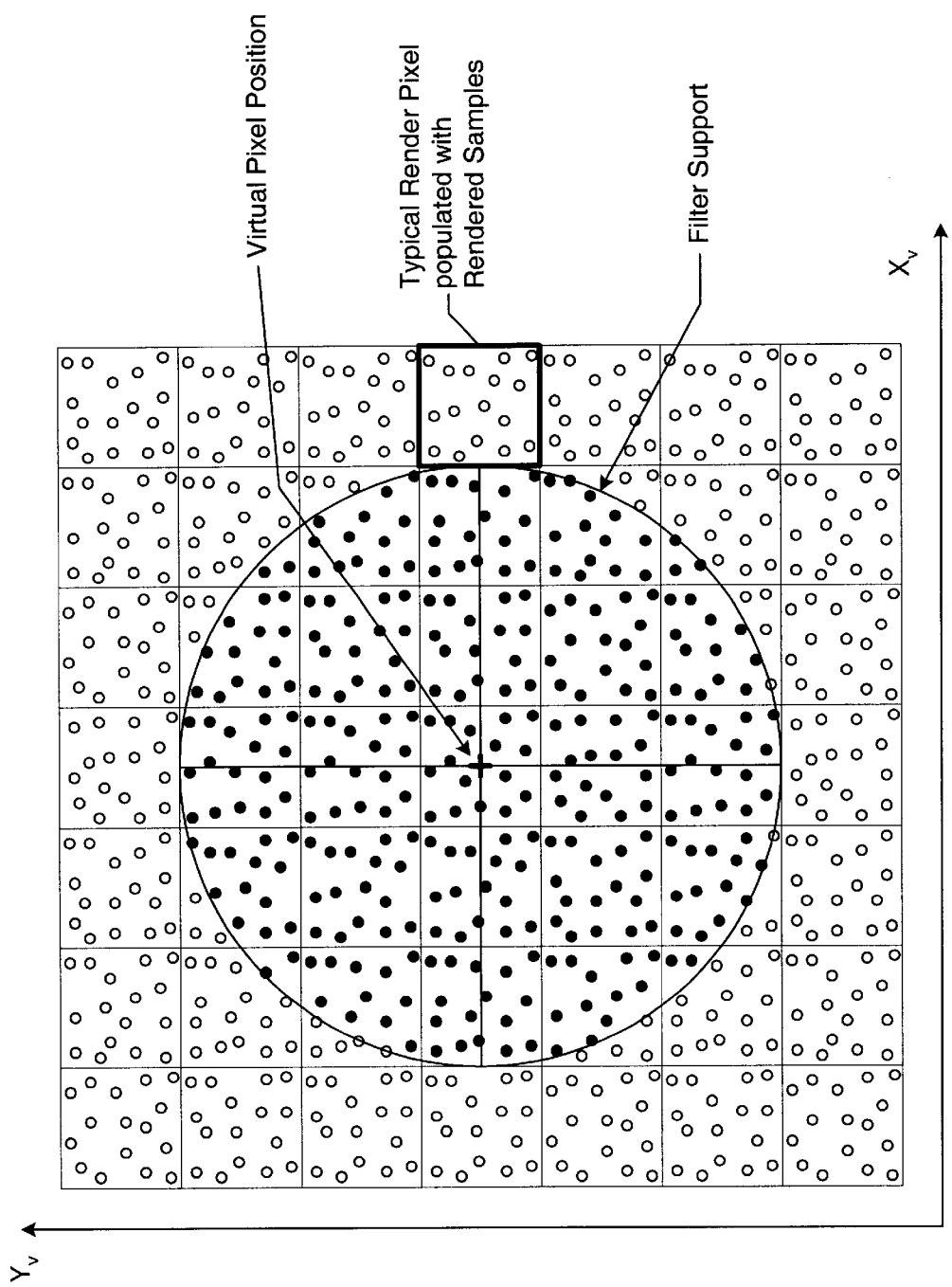
FIG. 12B illustrates the computation of a single video output pixel based on a filter with circular support according to one set of embodiments.

Filtering engine 106 may compute a video output pixel at a particular virtual pixel position as suggested by FIG. 12B. Filtering engine 106 computes the video output pixel based on a filtration of the samples falling within a filter support region centered on the virtual pixel position. Each sample S falling within the filter support may be assigned a filter coefficient $C_S$ based on (a) the sample's position with respect to the virtual pixel position, and (b) the sample's blur magnitude value (or blur code value).

In one set of embodiments, the sample's blur magnitude $B_S$ may specify the spatial cutoff frequency of the filter function used to determine the sample's filter coefficient $C_S$. The spatial cutoff frequency of the filter function may be a decreasing function of blur magnitude. A blur magnitude of zero may specify a highly reconstructive filter which passes spatial frequencies up to the anti-aliasing cutoff frequency (i.e. one cycle per two video output pixels). For example, a windowed sinc filter (or Catmull-Rom filter) with central lobe width equal to two pixels may serve as the highly reconstructive filter corresponding to zero blur magnitude. A maximal blur magnitude may specify a filter which passes spatial frequencies up to a significantly smaller cutoff frequency. For example, a cylinder filter or Gaussian filter may serve as the maximal blur filter. Thus, the sample's blur magnitude selects a filter function out of a family of filter functions parameterized by blur magnitude.

It is noted that the filtering hardware in filtering engine 106 may be configured to load sample data from sample buffer 104 into a local memory, and perform the filtering computations for a pixel based on the sample data stored in the local memory. The storage of samples in the sample buffer 104 and in the local memory may be organized according to render pixels. The capacity of the local memory may set a maximum on the number of render pixels can contribute samples to the pixel computation. For example, the local memory may have sufficient capacity to store a 5×5 neighborhood of render pixels. Thus, any filter function applied to the samples has an effective maximum domain that fits within the 5×5 neighborhood. As noted above, the blur magnitude of a sample may control the choice of a filter (to be applied to the sample) from an ensemble of filters. The ensemble of filters varies from reconstructive (i.e. with maximal cutoff frequency) to significantly blurring depending on the blur magnitude. One mechanism for generating such an ensemble uses with a base filter $F_B(r)$ and expanded versions thereof. The base filter $F_B$ may be configured to approximate the ideal sinc filter which retains frequencies up to the cutoff frequency of one cycle per two video output pixels. The base filter may be expanded in the radial direction by scaling the radius r of samples before evaluating the base filter. An expanded filter $F_k(r)$ may be defined by $F_k(r)=F_B(r/k)$ where k>1 is the expansion factor. Of course, the portion of the expanded filter $F_k(r)$ which fits within the 5×5 neighborhood will appear less and less like a sinc function as k increases. As k increases, the central lobe expands to consume to the whole 5×5 neighborhood. As k increases further, the retained portion begins to appear like a box filter. This departure of the restricted filters from the form of an ideal sinc is acceptable because the expanded filters are desired not for the sharpness of their cutoff but for their capacity to generate successively increasing amounts of blur as k increases.

Given sample S interior to the filter support and the filter function $F_B$ defined by the sample's blur magnitude, the sample's filter coefficient $C_S$ may be determined by evaluation of the filter function $F_B$. The filter function $F_B$ may be a function of some measure of the sample's distance from the filter center (i.e. the virtual pixel position). For example, the distance measure may be the sample's radius, square radius, $L_1$ norm, or $L^{infinity}$ norm with respect to the filter center. Filtering engine 106 may compute the sample's distance measure and evaluate the filter function $F_B$ at this distance measure to determine the sample's filter coefficient $C_S$.

It is noted that the filter functions in the parameterized family may not all have the same net volume. For example, in some embodiments, the filter functions in the parameterized family may be generated by radially expanding the zero-blur reconstruction filter $F_0(r)$ by varying amounts. The amount of induced blurring depends on the radial expansion factor, i.e. larger expansions give increased blur. However, when a function of radius is expanded radially by a factor of k, the volume of the function increases. Thus, a field of samples having constant color will appear brighter when filtered with expanded function $F_0(r/k)$ than with original function $F_0(r)$. Thus, it may be necessary to multiply the sample's filter coefficient $C_S$ by a scale correction factor $g_s$ to get all the filter functions on an equal volumetric basis:

$$\hat{C}_S = C_S * g_S.$$

The scale correction factor $g_s$ may be determined by the sample's blur magnitude.

The color components of the video output pixel may be determined by computing a weighted sum of the corresponding sample color components for samples falling inside the filter support. (The samples falling inside the filter support are denoted in FIG. 12B as black dots while the exterior samples are denoted as small circles.) For example, filtering engine 106 may compute a red value $R_P$ for the video output pixel P based on the relation $$R_P = \frac{1}{E} \sum \hat{C}_S R_S,$$

where the summation includes one term for each sample S interior to the filter support, where $R_S$ is the red sample value of the sample S. Similar summations may be used to compute the other color components and perhaps non-color components (such as α) of the video output pixel based on the corresponding components of the samples.

The value E is a normalization value that may be computed according to the relation $$E = \Sigma \hat{C}_S,$$

where the summation includes one term for each sample S falling in the filter support. The summation for the normalization value E may be performed in parallel with the red, green, blue and/or alpha pixel value summations.

In some embodiments, the sample's filter coefficient $C_S$ may be determined by table lookup. For example, in one embodiment, the square radius of a sample with respect to the virtual pixel position is determined by adding the squares of the sample's delta x and delta y with respect to the virtual pixel position. The square radius may be converted into a stubby floating point format. The stubby floating-point square radius and the sample's blur magnitude (or blur code value) may be used to access a filter coefficient table. The filter coefficient table may store tabulated values for each function in the parameterized family of filter functions. It is noted that the filter coefficient table may be indexed by any of various radial distance measures. For example, the sample's radius with respect to the filter center may be used as the indexing parameter at the expense of performing a square root.

In a second embodiment, the filter coefficient table may store tabulated values for a single filter function (e.g. the zero-blur reconstruction filter $F_0$). The sample's radius $r_S$ (or stubby floating-point square radius) may be multiplied by a positive scaling factor $v_S$. The resulting product $r_S v_S$ may be used to access the filter coefficient table. Multiplying the sample radius by scaling factor $v_S$ prior to the table evaluation of function $F_0$ has the effect of radially expanding the function $F_0$ by a factor of $(1/v_S)$. Scaling factors $v_S$ smaller than one (yet still positive) induce proper expansions, and the closer the scaling factor is to zero, the greater the induced expansion. The scaling factor $v_S$ may be determined by the sample's blur magnitude (or blur code value), e.g. by a separate table lookup.

In a third embodiment, the filter coefficient table of the second embodiment above may be replaced by a dedicated function evaluation circuit. The function evaluation circuit may receive an input argument U and evaluate the function $F_0$ on the input argument U. The function evaluation circuit may store parameters (e.g. polynomial coefficients) which characterize the function $F_0$. As above, the input argument may be the scaled radius $r_S v_S$.

Filtering engine 106 may use any of a variety of filters either alone or in combination to compute pixel values from sample values. For example, filtering engine 106 may use the box filter, the tent filter, the cone filter, the cylinder filter, the Gaussian filter, the Catmull-Rom filter, the Mitchell-Netravali filter, the windowed sinc filter, or in general, any form of bandpass filter or any of various approximations to the sinc filter.

Filtering engine 106 may include one or more dedicated chips optimized for performing the filter coefficient lookups, the coefficient-color (or coefficient-alpha) multiplications, the summations of the resultant products and the coefficient values, the reciprocation of the normalization constant E, and multiplication of the various summations by (1/E).

The filter support is illustrated in FIG. 12B as a circular disk with diameter equal to 5 render pixels. However, the present invention contemplates a variety of values for the filter support diameter. Larger values for the filter support diameter imply the need for increased silicon area for processing samples in order to maintain a constant pixel output rate.

As mentioned above, in order to generate a frame of video output, filtering engine 106 may scan through the virtual screen space generating an array of virtual pixel positions and computing pixel components (e.g. red, green, blue and alpha) at each of the virtual pixel positions. Let $M_f$ denote the number of virtual pixel positions in the horizontal direction, and $N_f$ denote the number of virtual pixel positions in the vertical direction. The video output for a given frame may be generated by filtering engine 106 according to the following pseudo-code fragment.

```
I=0;
J=0;
X^r=X_start;
Y^r=Y_start;
while (J<N_f) {
    while (I <M_f) {
        Pixel Values = Filter (X^r,Y^r);
        Output PixelValues;
        X^r = X^r+ΔX;
        I = I + 1;
    }
    X^r=X_start;
    Y^r=Y^r+ΔY;
```

```
    J=J+1;
}
```

The index I is a horizontal index. The index J is a vertical index. Recall that the point $(X_{start}, Y_{start})$ defines the start position in the virtual screen space for the array of virtual pixel positions. The function Filter(*,*) represents the filtration of samples in the neighborhood of the current virtual pixel position $(X^r, Y^r)$ to determine the components (e.g. color) of the current output pixel as described above in connection with FIG. 12B. Once computed, the pixel values may be output to a display device (e.g. a projector or monitor). The inner loop generates successive virtual pixel positions within a single row. The outer loop generates successive rows. The above fragment may be executed once per video frame. It is noted that the virtual pixel array parameters $X_{start}$, $Y_{Start}$, $\Delta X$, $\Delta Y$, $M_f$ and $N_f$ are programmable and dynamically adjustable. Thus, graphics system 112 may be configured to support arbitrary video formats. Furthermore, the array of virtual pixel positions may be mapped into the virtual screen space with arbitrary position, horizontal scale and vertical scale.

Most of the discussion above has focused on a double-buffered sample buffer. However, in other embodiments, the sample buffer 104 may be triple-buffered, or N-fold buffered wherein N is a positive integer greater than two, at the expense of increased latency. In one alternative embodiment, the sample buffer may be single buffered.

Pupil Diameter

In the real world, the instantaneous depth of field of an eye depends on the pupil diameter. The depth of field decreases as the pupil diameter increases. In one set of embodiments, the graphics system may couple to a sensor (or sensors) which measures the pupil diameter (or pupil area) for one or both eyes of the viewer (or which provides measurements from which pupil diameter may be computed). The pupil diameter(s) may be used to dynamically update the blur valley width W along with the eye-relative concentration depth $Z_{p/e}$. The partial derivative of valley width W with respect to pupil diameter may be negative.

More Generalized Blur Effects

In the embodiments above, the blur magnitude was used to induce blurring of samples for depth-of-field emulation, i.e. to present pixilated virtual objects to the viewer with a depth-dependent blurring that approximates the depth-of-field related blurring of physical objects observed in the real world. However, it is noted that the blur magnitude may be used to induce blurring of samples for any of a variety of reasons. For example, in some embodiments, virtual objects may be blurred by an amount dependent on their speed relative to the virtual camera's field of view. This blur effect is referred to as motion blur. Please refer to U.S. patent application Ser. No. 09/571,768, filed on May 16, 2000, entitled "Graphics System Using Sample Tags for Blur", invented by Michael F. Deering, and U.S. patent application Ser. No. 09/571,988, filed on May 16, 2000, entitled "Graphics System Using Sample Masks for Motion Blur, Depth of Field, and Transparency", invented by Michael F. Deering and Scott R. Nelson for further description of graphics systems configured to generate motion blur effects. These applications are hereby incorporated by reference in their entirety.

Virtual objects may be blurred by virtue of their own motion (e.g. translation and/or rotation) and/or movement of the virtual camera position and/or orientation. Rendering engine 102 may compute a camera-relative velocity for each primitive. The component of the camera-relative velocity normal to the camera's view axis may be used to determine the blur magnitude for samples interior to the primitive. For example, rendering engine 102 may compute a motion blur value based on the normal velocity component and a depth-dependent blur value (as described above for creating a depth-of-field effect) for each interior sample. The motion blur value and depth-dependent blur value may be combined to determine the final blur magnitude for the interior sample. In one embodiment, the final blur magnitude for a sample is the maximum of the motion blur value and the depth-dependent blur value.

The blurring of image information may be desirable for a variety of reasons. Thus, the blur magnitude may be viewed as a generalized blur channel allowing a variable amount of blur to be applied to individual samples regardless of the reason for which the blur is desired.

Anisotropic Filtering

In one set of embodiments, filtering engine 106 may be configured to operate with filter functions more general than the radially-symmetric filter functions described above. For example, a filter function $f(x,y)=\text{sinc}(\pi x)$ with fixed filter support may induce blurring in the y direction and accurate reconstruction in the x direction. A rotation through angle $\theta$ followed by evaluation of the same filter function, i.e.

$$u=x^* \cos(\theta)+y^* \sin(\theta)$$

$$v=-x^* \sin(\theta)+y^* \cos(\theta)$$

$$f(u,v)=\text{sinc}(\pi u)$$

induces accurate reconstruction in the direction corresponding to angle $\theta$ and blurring in the orthogonal direction. The filter function $$f(x,y)=\text{sinc}(k_x \pi x)\text{sinc}(k_y \pi y)$$

induces blurring in the x and y directions dependent on the values of scaling factors $k_x$ and $k_y$. More generally, it may be desirable to determine a filter function so that the amount of blurring it induces in a first direction is different from the amount of blurring it induces in a second direction (e.g. the orthogonal direction).

In one embodiment, rendering engine 102 may be configured to assign to each sample a blur indicator which is flexible enough to store a blur magnitude for isotropic blurring and/or directional information for anisotropic blurring. For example, rendering unit 102 may assign the blur magnitude based on the sample's depth and an estimate of the viewer's instantaneous concentration depth, and a blur direction based on the normal component of the sample's velocity as seen on the retina of the viewer's eye(s). Filtering engine 102 may apply isotropic blurring to the sample based on the blur magnitude and anisotropic blurring to the sample based on the blur direction, and combine the isotropically blurred pixel values with the anisotripically blurred pixel values.

A head tracker and eye trackers may be used to control the position and orientation of virtual cameras in the world coordinate system. Thus, the retinal velocity of a sample may be estimated from that component of the sample velocity normal to the direction of view of the virtual camera.

Filtering engine 106 may include a filter evaluation unit which generates a filter coefficient on the basis of a sample's x and y displacements with respect to the filter center.

Encoding the Blur Magnitude

Rendering engine 102 may compute the blur magnitude with N-bits of precision, and encode the blur magnitude into an M-bit blur code value where M is smaller than N. Samples are stored into sample buffer 104 with their blur code values rather than the blur magnitudes. A blur code length M=1 allows only two blur states: i.e. blur or no blur. More generally, a blur code of length M allows $2^M$ blur states. If the blur code length is smaller than some minimum length $M_{min}$, the depth-dependent blur generated by graphics system 100 may appear discontinuous, i.e. the viewer may be able to perceive the discrete jump between consecutive blur states. Thus, in one set of embodiments, the blur code length is greater than or equal to the minimum length $M_{min}$. The value $M_{min}$ may be determined by empirical studies. In one embodiment, the blur code length M may be user controllable. The present invention contemplates a wide variety of values for the blur code length M.

Multi-Resolution Sample Buffer

In one set of embodiments, sample buffer 104 may include two or more sub-buffers. Each sub-buffer operates at a different render array resolution. For example, a first sub-buffer may store samples corresponding to an $M_r \times N_r$ render pixel array. The second sub-buffer may store samples corresponding to an $(M_r/2) \times (N_r/2)$ render pixel array. In both sub-buffers, the number $N_{s/rp}$ of samples per render pixel may be the same. Thus, when filtering engine 106 accesses a render pixel's worth of samples from the second sub-buffer for filtering, those samples cover an area equal to four render pixels in the first sub-buffer. Filtering engine 106 may be configured to filter samples based on a support region which is fixed in terms of render pixel dimensions regardless of the sub-buffer from which the render pixels are being accessed. For example, in one embodiment, the filter engine 106 operates on a 5 by 5 rectangle of render pixels. Because the fixed filter support covers four times as much image area when accessing samples from the second sub-buffer, filtering engine 106 may advantageously access the second sub-buffer when blur effects are to be generated, and access the first sub-buffer when accurate anti-aliasing is to be performed.

In one embodiment, filtering engine 106 may be configured to compute a first set of color values for a given video pixel based on filtration of the samples from the first sub-buffer, and a second set of color values for the given video output pixel based on filtration of samples from the second-buffer. In both filtrations, filtering engine 106 may access samples corresponding to a fixed support region in terms of render pixels. The final color values for the given video pixel may be generated by combining the corresponding color values from the first set and second set.

Added Mileage from Fixed Set of Adder Trees

As described above, filtering engine 106 scans through the virtual screen space generating virtual pixel positions, and filtering samples in the neighborhood of each virtual pixel position. Thus, filtering engine 106 may include one or more adder trees fast computation of the sums of weighted sample color values. The adder trees may be optimized for a given number of samples assuming a given footprint of render pixels and a given number $N_{s/rp}$ of samples per render pixel. For example, in one embodiment, an adder tree may be configured to support 25*16 samples corresponding to a footprint of 5 by 5 render pixels and 16 samples per render pixel.

In order to attain more effective blur from the fixed capacity adder tree, filtering engine may access samples from sample buffer 104 with a larger footprint (e.g. twice as large in the horizontal and vertical dimensions), compute sample radii with respect to the filter center for every fourth sample in the larger footprint (i.e. half the samples in each direction), evaluate filter coefficients for these selected samples, weight the sample color values with the corresponding filter coefficients, and feed the weighted sample color values to one or more adder trees.

Other Rendering Pipelines

The present invention contemplates a wide variety of rendering pipeline architectures. FIG. 6 presents one embodiment of a rendering pipeline. In a second set of embodiments, rendering engine 102 may subdivide triangles into subtriangles until the subtriangles are smaller than programmable size value (e.g. relative a render pixel). Furthermore, the lighting computation 206 may be deferred until these ultimate triangles are obtained. Lighting intensity values (e.g. color intensity values) and texture values may be computed for the vertices of these ultimate subtriangles. The lighting intensity values and texture values at the vertices of the ultimate subtriangles may then be used to determine color intensity values for supersamples inside each ultimate subtriangle. For example, the lighting intensity values and texture values at the vertices of an ultimate triangle may be combined to determine a single RGB vector for the ultimate triangle. The single RGB vector may be assigned to all supersamples interior to the ultimate triangle. This scheme of using a constant color for the supersamples inside an ultimate triangle is referred to herein as "flat fill".

Variable Optics

In one collection of embodiments, two variable optics systems configured between the viewer's eyes and the display surface may be employed to vary the apparent distance of the display surface with respect to the viewer's eyes. For example, the two variable optics systems may be packaged into a single unit that may be placed on the head. Each variable optics system may vary the apparent distance to the display surface as seen by the corresponding eye so that the apparent distance agrees with the eye's distance to the intersection point of the ocular rays. The variable optics together with the depth-dependent blurring of objects (based on tracking of the viewer's concentration depth as described above) implies that the viewer may very naturally view virtual objects as he/she would view physical objects in the real world, i.e. the viewer need not unlearn the instinct to optically focus at the intersection point of the ocular rays.

Separate Depth-Dependent Blur for Each Eye

In one set of embodiments, rendering engine 102 may be configured to apply separate depth-dependent blur functions to samples intended for the right eye and sample intended for the left eye. Furthermore, rendering engine 102 may compute the distance of the intersection point of the ocular rays from each of the viewer's eyes. The depth location of the minimum for each blur function may be dynamically updated in response to a tracking of the instantaneous distance of the corresponding eye from the intersection point.

Chromatic Distortion Emulation

The human eye like many other optical systems experiences chromatic aberration. A ray of light impinging on the eye experiences chromatic aberration in passage through the optical elements of the eye (e.g. the cornea and the crystalline lens). The ray separates into a fan of wavelength components by the time it hits the retina. Thus, a cone of light emanating from a source point in space and impinging on the eye may be imaged on the retina as a fuzzy locus of points with distorted color. The amount of chromatic aberration as seen on the retina may be a function of the spatial position of the source point (e.g. with respect to some coordinate system rigidly coupled to the eye) and the physical state of the crystalline lens. The human brain may use changes in the instantaneous pattern of chromatic aberration generated on the retina as a clue that the ocular intersection point P is getting closer to or farther from locking onto an object.

U.S. patent application Ser. No. 09/810,112 filed on Mar. 16, 2001, entitled "A Graphics System Configured to Perform Distortion Correction" is herby incorporated by reference in its entirety. This patent application teaches how to configure the filtering engine 106 to correct for chromatic distortions such as chromatic aberration. These teachings may be used in the context of the present invention to generate chromatic distortions, i.e. to generate a pattern of chromatic distortions that the viewer's brain expects to see on the retina for the current position of the intersection point P in space. The red, green, and blue components of a video output pixel may be computed at separate virtual pixel centers in screen space. The distances between the red, green, and blue virtual pixels centers for each video output pixel may be controlled by the chromatic distortion values of one or more samples corresponding to the video output pixel (e.g. one or more samples in the vicinity of the video output pixel).

The chromatic distortion value for each sample may be generated by the rendering engine 102 and stored along with the sample in the sample buffer 104. Rendering engine 102 may determine the chromatic distortion value for each sample based on an evaluation of a chromatic distortion function at the sample's position $(x_S, y_S, z_S)$. Rendering engine 102 may adjust the distortion function so that some feature of the function (e.g. a minimum or a maximum or an inflection point) tracks the instantaneous position of the intersection point P. In one embodiment, rendering engine 102 may compute the difference $z_S - Z_{p/e}(t)$ between the sample's z coordinate and the instantaneous eye-relative concentration depth $Z_{p/e}(t)$, and evaluate a distortion function $D(x_S, y_S, z_S - Z_{p/e}(t))$. Thus, the distortion function shifts in time along the z axis in response to changes in the eye-relative concentration depth $Z_{p/e}(t)$. In one embodiment, rendering engine 102 may maintain two separate distortion functions, i.e. one for each eye. Furthermore, parameters of the distortion function may change based on the instantaneous eye-relative concentration depth $Z_{p/e}(t)$ or other measured parameters. For example, the width of a valley in the distortion function may change as a function of the instantaneous eye-relative concentration depth.

Reduced versions of the distortion function may be used in alternate embodiments. For example, the distortion function D reduces to a one variable function if the x and y dependencies are ignored.

As used herein the term "distortion value" refers to any value that specifies an amount of distortion to be applied by the filtering engine to sample color components to generate pixel color components. Thus, distortion values may include blur magnitude values and chromatic distortion values.

In one set of alternative embodiments, the distortion function D may be a fixed function of the x, y and z coordinates. In other words, the distortion function does not track with motions in intersection point P.

Conclusion

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphical processing system comprising:
a rendering engine configured to receive a stream of graphics primitives, generate a plurality of sample positions in a two-dimensional field, compute depth values and color values for sample positions interior to the graphics primitives, and assign blur values to the interior sample positions based on the depth values and a concentration depth of a viewer;
a sample buffer configured to store the blur values and the color values for the interior sample positions of the graphics primitives;
a filtering engine configured to read the blur values and the color values corresponding to sample positions in a neighborhood of a current filter center, assign filter coefficients to the sample positions of the neighborhood based on positional measures of the sample positions with respect to the filter center and the corresponding blur values, multiply the color values of the neighborhood by the assigned filter coefficients to generate weighted color values, compute a pixel value based on the weighed color values;
wherein the pixel value is usable to modify the state of a display device.

2. The graphical processing system of claim 1, wherein the rendering engine is configured to assign the blur value to each interior sample based on a blur function of the depth value which attains a minimum at the concentration depth of the viewer.

3. The graphical processing system of claim 2, wherein the rendering engine is configured to dynamically adjust a width of a valley in the blur function based on data selected from the group consisting of: (a) the concentration depth, (b) a pupil diameter, and (c) both the concentration depth and the pupil diameter.

4. The graphical processing system of claim 1, wherein the rendering engine is configured to receive sensor measurements and compute the concentration depth of the viewer based on the sensor measurements.

5. The graphical processing system of claim 4, wherein the rendering engine is configured to couple to a pair of eye trackers, wherein said sensor measurements include eye orientation information generated by said pair of eye trackers.

6. The graphical processing system of claim 4, wherein the rendering engine is configured to couple to a head tracker, wherein said sensor measurements include measurements of the distance of the viewer's head with respect to a display surface associated with said display device.

7. The graphical processing system of claim 1, wherein the filtering engine is configured to assign a filter coefficient to each sample position of the neighborhood based on evaluation of a filter function having a spatial cutoff frequency defined by the corresponding blur value at the positional measure of the sample position.

8. The graphical processing system of claim 7, wherein the spatial cutoff frequency of the filter function is a decreasing function of the blur value.

9. The graphical processing system of claim 7, wherein the filtering engine is configured to evaluate the filter function by multiplying the positional measure by a scaling factor determined by the blur value, and evaluating a tabulated function using the scaled positional measure.

10. The graphical processing system of claim 1 further comprising a first variable optics system configured between a first eye of the viewer and a first display surface on which the display device generate video output, wherein the first variable optics system is configured to vary an apparent distance of the display surface relative to the first eye so that the apparent distance equals the distance of the first eye to an ocular intersection point.

11. A method for processing graphical data, the method comprising:
receiving a stream of graphics primitives;
generating a plurality of sample positions in a two-dimensional field, and
computing depth values and color values for sample positions interior to the graphics primitives;
assigning blur values to the interior sample positions based on the depth values and a concentration depth of a viewer, and storing the blur values and the color values for the interior samples of the graphics primitive in a sample buffer;
subsequently reading the blur values and the color values corresponding to sample positions in a neighborhood of a current filter center from the sample buffer;
assigning a filter coefficient to each sample position of the neighborhood based on a positional measure of the corresponding sample position with respect to the filter center and the corresponding blur value;
multiplying each color value of the neighborhood by the assigned filter coefficient to generate a weighted color value, and computing a pixel value based on the weighed color values;
providing a video signal for display on a display device, wherein at least a portion of the video signal is determined by the pixel value.

12. The method of claim 11, wherein said assigning the blur value to each interior sample position comprises evaluating a blur function at the depth value of the interior sample position, wherein the blur function attains a minimum at the concentration depth of the viewer.

13. The method of claim 12, further comprising dynamically adjusting a width of a valley in the blur function based on data selected from the group consisting of: (a) the concentration depth, (b) a pupil diameter, and (c) both the concentration depth or the pupil diameter.

14. The method of claim 11, further comprising receiving sensor measurements and computing the concentration depth of the viewer based on the sensor measurements.

15. The method of claim 14, wherein said receiving sensor measurement comprises receiving eye orientation information from a pair of eye trackers.

16. The method of claim 14, wherein said receiving sensor measurements comprises receiving a measurement of the viewer's head relative to a display surface associated with the display device.

17. The method of claim 11, wherein said assigning the blur value to each sample position of the neighborhood comprises evaluating of a filter function having a spatial cutoff frequency defined by the corresponding blur value at the positional measure of the sample position.

18. The method of claim 17, wherein the spatial cutoff frequency of the filter function is a decreasing function of the blur value.

19. The method of claim 17, wherein said evaluating the filter function comprises multiplying the positional measure by a scaling factor determined by the blur value, and evaluating a fundamental function using the scaled positional measure.

20. A computer system comprising:

a display device;

a host computer configured to execute a graphics application program;

a graphics system coupled to the display device and the host computer, wherein the graphics system is configured to receive a stream of graphics primitives from the host computer in response to execution of the graphics application program, wherein the graphics system comprises:

a rendering engine configured to sense a concentration depth of a viewer, to generate a plurality of samples in response to the graphics primitives, to assign a blur value to each of said samples based on the depth of said samples relative to the concentration depth;

a sample buffer configured to store the samples and the blur value for each sample;

a filtering engine configured to read a plurality of said samples and the corresponding blur values from the sample buffer, to filter said plurality of samples to generate a pixel value, and to transmit the pixel value to the display device, wherein said filtering operates on each of said samples with a corresponding filter function having a spatial cutoff frequency determined by the corresponding blur value.

21. A graphical processing system comprising:

a rendering engine configured to receive a stream of graphics primitives, generate a plurality of sample positions in a two-dimensional field, compute a depth value and a color value for each sample position interior to each of the graphics primitives, assign a blur value to each interior sample position based on the depth value and a concentration depth of a viewer;

a sample buffer configured to store the blur value and the color value for each interior sample of each graphics primitive;

a filtering engine configured to (a) read the blur values and the color values corresponding to local sample positions within a limited distance of a current filter center from the sample buffer, (b) assign filter coefficients to said local sample positions based on relative distances of said local sample positions from said filter center and the corresponding blur value, (c) multiply the color value of each local sample position by the assigned filter coefficient to generate a weighted color value, (d) compute a pixel value based on the weighed color values, and (e) transmit a video signal which is partially determined by said pixel value to a display device.

22. The graphics system of claim 21, wherein the concentration depth of the viewer is repeatedly updated in response to repeated sensor measurements.

23. A graphics system comprising:

a rendering engine configured to generate depth values and sample color vectors for a plurality of sample positions, and assign chromatic distortion values to the sample positions based on data comprising the depth values and a concentration depth of a viewer, wherein the sample color vectors include a first color component and second color component for each sample position;

a sample buffer configured to store the chromatic distortion values and the sample color vectors for the sample positions;

a filtering engine configured to read the chromatic distortion values and the sample color vectors for the sample positions from the sample buffer, compute a first pixel color for an output pixel by filtering the first color components of the sample color vectors in a first neighborhood of a first position, compute a second pixel color for the output pixel by filtering the second color components of the sample color vectors in a second neighborhood of a second position, wherein a distance of separation between the first position and the second position is controlled by the chromatic distortion value;

wherein the first pixel color and the second pixel color are usable to generate at least a portion of a displayable image.

24. The graphics system of claim 23, wherein the data further comprises the sample positions.

25. The graphics system of claim 23 further comprising a sensor interface configured to receive measurements from eye trackers, and the measurements are usable to determine the instantaneous concentration depth.

26. The graphics system of claim 23, wherein the rendering engine is configured to compute difference values between the depth values and the concentration depth of the viewer, and to evaluate a chromatic distortion function using the difference values to determine the chromatic distortion values.

27. The graphics system of claim 26, wherein the rendering engine is configured to determine one or more features of the chromatic distortion function based on the value of the concentration depth of the viewer.

28. A graphics system comprising:

a rendering engine configured to generate depth values and distortion values for a plurality of samples in response to measurements of at least an instantaneous concentration depth of a viewer;

a sample buffer configured to store the depth values and distortion values for the plurality of samples; and a filtering engine configured to generate pixel color components for an output pixel by filtering corresponding color components of the samples, wherein the distortion values of the samples determine an amount of distortion the filtering engine applies to the sample color components of the samples in a filtration process to generate the pixel color components;

wherein the output pixel determines at least a portion of a displayable image.

29. The graphics system of claim 28 wherein the amount of distortion comprises a displacement between a first color computation position and a second color computation position.

30. The graphics system of claim 28, wherein the filtering engine is configured to perform the filtration process by computing a weighted sum of the sample color components to generate the pixel color components for the output pixel, wherein the distortion value for each sample determines the cutoff frequency of a spatial filter which is evaluated to determine a sample weight for the sample in the weighted sum.

31. The graphics system of claim 28 further comprising a sensor interface configured to receive measurement data from one or more sensor devices, and to compute the instantaneous concentration depth of the viewer in response to the measurement data.

\* \* \* \* \*